United States Patent
Yamasaki et al.

(10) Patent No.: US 6,920,577 B2
(45) Date of Patent: Jul. 19, 2005

(54) CLOCK SELECTION CIRCUIT FOR SELECTING BETWEEN AN EXTERNAL CLOCK AND A CLOCK GENERATED BY COMPARING A COUNT VALUE WITH A SETTING VALUE

(75) Inventors: Takashi Yamasaki, Tokyo (JP); Hideo Matsui, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 936 days.

(21) Appl. No.: 09/881,712

(22) Filed: Jun. 18, 2001

(65) Prior Publication Data

US 2002/0099969 A1 Jul. 25, 2002

(30) Foreign Application Priority Data

Jan. 19, 2001 (JP) ........................................ 2001-012294

(51) Int. Cl.[7] .............................. G06F 1/04; G06F 12/00
(52) U.S. Cl. ....................... 713/600; 713/500; 713/502; 711/100
(58) Field of Search ................................ 713/400, 500, 713/502, 503, 600; 711/100

(56) References Cited

U.S. PATENT DOCUMENTS

| | | | | |
|---|---|---|---|---|
| 4,468,724 A | * | 8/1984 | Omae et al. ................... | 363/88 |
| 5,625,843 A | * | 4/1997 | Lee ............................ | 710/22 |
| 5,708,817 A | * | 1/1998 | Ng et al. .................... | 710/266 |
| 5,881,007 A | * | 3/1999 | Jeong et al. ................ | 365/207 |
| 6,393,577 B1 | * | 5/2002 | Akamatsu et al. .......... | 713/600 |
| 6,667,663 B2 | * | 12/2003 | Ozawa ........................ | 331/17 |

FOREIGN PATENT DOCUMENTS

JP    A 2-128287    5/1990

* cited by examiner

*Primary Examiner*—Thomas Lee
*Assistant Examiner*—Mark Connolly
(74) *Attorney, Agent, or Firm*—Burns, Doane, Swecker & Mathis, L.L.P.

(57) ABSTRACT

A setting value is initially stored in a comparison and coincidence register. Thereafter, a value of a count signal is incremented in a base timer while resetting the value of the count signal to zero each time the value of the count signal reaches a prescribed value. A coincidence signal set to "1" is output from the comparison and coincidence register each time the setting value agrees with the value of the count signal, and a clock signal is produced in an RS flip-flop according to the coincidence signal. A data transmission is performed each time the coincidence signal is received in a transmission shift register. On a reception side, the clock signal is received, and the data is received according to the clock signal. Therefore, in cases where a desired setting value is stored in the comparison and coincidence register, the repetition period of the data transmission and reception can be freely changed. Also, the timer function of the base circuit is, as it is, used to transmit or receive data, the number of elements required in the data input and output device can be reduced in hardware.

14 Claims, 15 Drawing Sheets

CLOCK SELECTION CIRCUIT FOR SELECTING BETWEEN AN EXTERNAL CLOCK AND A CLOCK GENERATED BY COMPARING A COUNT VALUE WITH A SETTING VALUE

BACKGROUND OF THE INVENTION

1. Field of the Invention

The present invention relates to a data input and output device used for a microcomputer, and more particularly to a data input and output device in which the data transmission and reception is performed by using a timer function.

2. Description of Related Art

In a conventional serial data input and output device, pieces of data are serially transmitted in synchronization with a clock signal output from an internal pre-scaler. In a serial reception, the pieces of data, which are received in synchronization with a clock signal sent from a transmission side, are received and sampled.

FIG. 14 is a block diagram showing the configuration of the conventional data input and output device. In FIG. 14, 100 indicates a pre-scaler for dividing a frequency of a referential clock signal received from a clock oscillating circuit (not shown) to produce a clock signal CLKout of the data transmission and reception. 200 indicates a transmission shift register for transmitting data in synchronization with a clock signal CLKin received from the outside or the clock signal CLKout produced in the pre-scaler 100. 300 indicates a reception shift register for receiving data in synchronization with the clock signal CLKin received from the outside or the clock signal CLKout produced in the pre-scaler 100. 400 indicates a selector for selecting either the clock signal CLKin received from the outside or the clock signal CLKout produced in the pre-scaler 100 and outputting the selected signal to the transmission shift register 200. 500 indicates a selector for selecting either the clock signal CLKin received from the outside or the clock signal CLKout produced in the pre-scaler 100 and outputting the selected signal to the reception shift register 300.

Next, an operation of the conventional data input and output device will be described below.

In this operation, the data transmission and reception performed in synchronization with the clock signal CLKout produced in the pre-scaler 100 is described. In this case, the clock signal CLKout produced in the pre-scaler 100 is selected as a shift clock signal in each of the selectors 400 and 500, and the shift clock signal is output to both the transmission shift register 200 and the reception shift register 300.

FIG. 15 is a timing chart of the data transmission and reception performed in the conventional data input and output device shown in FIG. 14. As shown in FIG. 15, the clock signal CLKout for the data transmission and reception is produced in the pre-scaler 100 in synchronization with a referential clock signal of which a frequency is divided in the pre-scaler 100.

The data transmission is initially described. A shift operation is performed in the transmission shift register 200 at a shift time by using the clock signal CLKout selected in the selector 400, and transmission data Sout is output from the transmission shift register 200. In the example shown in FIG. 15, the transmission data Sout is output from the transmission shift register 200 in synchronization with each trailing edge of the clock signal CLKout.

Next, the data reception is described. Because the data transmission and reception is performed in synchronization with the clock signal CLKout produced in the pre-scaler 100, reception data Sin is transmitted from a transmission side to the conventional data input and output device in synchronization with the clock signal CLKout. In the reception shift register 300, a shift operation is performed at a shift time by using the clock signal CLKout selected in the selector 500, and the reception data Sin is stored in the reception shift register 300. In the example shown in FIG. 15, the reception data Sin is stored in the reception shift register 300 in synchronization with each leading edge of the clock signal CLKout.

Though the pre-scaler 100 has a function for producing the clock signal CLKout for the purpose of the data transmission and reception performed in the data input and output device, the pre-scaler 100 is hardly used for operations using other functions. In contrast, a pre-scaler used in a one chip type microcomputer normally has a timer function as one of peripheral functions, and a referential clock signal or a clock signal transmitted from the outside is counted according to the timer function.

However, because the conventional data input and output device has the above described configuration, in cases where no clock signal sent from the outside is used but the clock signal CLKout produced in the pre-scaler 100 is used for a serial data transmission and reception, there is a problem that there is a probability that the data reception cannot be correctly performed while synchronizing the timing of the data reception with the timing of the data transmission. The problem is described in detail. In cases where data having both a first repetition period of logical values "0" and a second repetition period of logical values "1" different from the first repetition is transmitted from the conventional data input and output device of a transmission side to the conventional data input and output device of a reception side, unless an external clock signal synchronized with the transmission data is used on the reception side, the reception of the transmission data cannot be correctly performed. In other words, the reception of the transmission data cannot be correctly performed on the reception side by using the clock signal CLKout produced in the pre-scaler 100.

Also, the pre-scaler 100 is hardly used for operations other than the production of the clock signal CLKout. Therefore, there is another problem that the pre-scaler 100 is not effectively used for operations using peripheral functions such as a timer function.

SUMMARY OF THE INVENTION

An object of the present invention is to provide, with due consideration to the drawbacks of the conventional data input and output device, a data input and output device in which a repetition period of a data transmission or reception is freely changed by using a timer function originally provided for the device.

The object is achieved by the provision of a data input and output device comprising a timer circuit for counting a value of a count signal, resetting the value of the count signal to an initial value each time the value of the count signal reaches a prescribed value and outputting the value of the count signal at a prescribed interval, a comparison and coincidence register circuit for storing a setting value, comparing the setting value with the value of the count signal output from the timer circuit and outputting a coincidence signal each time the setting value agrees with the value of the count signal, a clock selecting circuit for receiving both an external clock signal and each coincidence signal output from the comparison and coincidence register circuit, selecting one of the signals and outputting the selected signal as a data shift clock signal, and a data shift register circuit for performing a data transmission or reception each time the data shift clock signal is received from the clock selecting circuit.

In the above configuration, a setting value corresponding to a data transmission or reception is initially stored in the comparison and coincidence register circuit. Thereafter, a value of a count signal is incremented in the timer circuit while resetting the value of the count signal to an initial value each time the value of the count signal reaches a prescribed value. Each time the setting value agrees with the value of the count signal, a coincidence signal is output from the comparison and coincidence register circuit to the clock selecting circuit. In the clock selecting circuit, one of the coincidence signal and an external clock signal is selected as a data shift clock signal. For example, the coincidence signal is selected. Thereafter, a data transmission or reception is performed in the data shift register circuit each time the data shift clock signal is received from the clock selecting circuit.

Therefore, because the data transmission or reception is performed each time the value of the count signal reaches the setting value, the data transmission or reception is performed at a prescribed repetition period. Accordingly, in cases where a desired setting value is stored in the comparison and coincidence register circuit, a repetition period of the data transmission or reception can be freely changed. Also, the timer function of the timer circuit is, as it is, used to transmit or receive data, the number of elements required in the data input and output device can be reduced in hardware.

It is preferred that the comparison and coincidence register circuit comprises a transmission comparison and coincidence register circuit for storing a setting value corresponding to a data transmission time and outputting a transmission coincidence signal as the coincidence signal each time the setting value agrees with the value of the count signal output from the timer circuit, and a reception comparison and coincidence register circuit for storing a setting value corresponding to a data reception time and outputting a reception coincidence signal as the coincidence signal each time the setting value agrees with the value of the count signal output from the timer circuit. The value of the count signal is cleared to the initial value in the timer circuit each time the transmission coincidence signal output from the transmission comparison and coincidence register circuit or the reception coincidence signal output from the reception comparison and coincidence register circuit is received in the timer circuit.

In the above configuration, because the value of the count signal is cleared to the initial value each time the data transmission or reception is performed. The repetition period of the data transmission or reception can be fixed without resetting the setting value.

Accordingly, because it is not required for a central processing unit to set a new setting value to the transmission comparison and coincidence register circuit or the reception comparison and coincidence register circuit each time the data transmission or reception is performed, the number of interruption operations to the central processing unit can be reduced. Also, in cases where a desired setting value is stored in the comparison and coincidence register circuit, the fixed repetition period of the data transmission or reception can be freely changed. Also, the timer function of the timer circuit is, as it is, used to transmit or receive data, the number of elements required in the data input and output device can be reduced in hardware.

It is preferred that the value of the count signal counted by the timer circuit is incremented, and the value of the count signal is reset to zero.

Accordingly, an operation of the timer circuit can be reliably performed.

The object is also achieved by the provision of a data input and output device comprising a timer circuit for counting a value of a count signal, resetting the value of the count signal to an initial value each time the value of the count signal reaches a prescribed value and outputting the value of the count signal at a prescribed interval, a comparison and coincidence register circuit for storing a setting value corresponding to a data transmission time and a setting value corresponding to a data reception time, comparing the setting value corresponding to the data transmission time with the value of the count signal output from the timer circuit, comparing the setting value corresponding to the data reception time with the value of the count signal output from the timer circuit, outputting a transmission coincidence signal each time the setting value corresponding to the data transmission time agrees with the value of the count signal and outputting a reception coincidence signal each time the setting value corresponding to the data reception time agrees with the value of the count signal, a flip-flop circuit for setting a logical value of a synchronization clock signal to a first value in synchronization with the reception of each transmission coincidence signal from the comparison and coincidence register circuit, setting a logical value of the synchronization clock signal to a second value different from the first value in synchronization with the reception of each reception coincidence signal from the comparison and coincidence register circuit and outputting the synchronization clock signal having two logical values, a clock selecting circuit for receiving an external clock signal and the synchronization clock signal output from the flip-flop circuit, selecting one of the signals and outputting the selected signal as a data shift clock signal, and a data shift register circuit for performing a data transmission or reception in synchronization with each logical value of the data shift clock signal received from the clock selecting circuit.

In the above configuration, a transmission coincidence signal is output from the comparison and coincidence register circuit to the flip-flop circuit each time the setting value corresponding to the data transmission time agrees with the value of the count signal, and a reception coincidence signal is output from the comparison and coincidence register circuit to the flip-flop circuit each time the setting value corresponding to the data reception time agrees with the value of the count signal. In the flip-flop circuit, a logical value of a synchronization clock signal is set to a first value in synchronization with the reception of each transmission coincidence signal, and the logical value of the synchronization clock signal is set to a second value in synchronization with the reception of each reception coincidence signal. Therefore, the synchronization clock signal having two logical values is produced. Thereafter, the synchronization clock signal is selected in the clock selecting circuit as a data shift clock signal, and a data transmission or reception is performed in the data shift register circuit in synchronization with each logical value of the data shift clock signal.

Accordingly, in cases where a desired setting value corresponding to the data transmission time and a desired setting value corresponding to the data reception time are stored in the comparison and coincidence register circuit, the repetition period of the data transmission and the repetition period of the data reception can be freely changed. Also, the timer function of the timer circuit is, as it is, used to transmit or receive data, the number of elements required in the data input and output device can be reduced in hardware.

It is preferred that a flip-flop circuit for setting a logical value of a synchronization clock signal of a data transmission and reception in synchronization with the reception of each coincidence signal from the comparison and coincidence register circuit and outputting the synchronization clock signal.

Accordingly, in cases where the synchronization clock signal produced in a transmission side (or a reception side) is output, the data reception (or the data transmission) can be performed on the reception side (or the transmission side) in synchronization with the synchronization clock signal.

It is preferred that the value of the count signal is cleared to the initial value in response to each leading edge or each trailing edge of a data signal received by the data shift register circuit.

Accordingly, even though a fault occurs in the data reception, the data reception can be performed in synchronization with the synchronization clock signal.

It is preferred that the setting value of the comparison and coincidence register circuit is stored according to a direct memory access.

Accordingly, a load of the setting of the setting value on a central processing unit can be reduced.

It is preferred that a data input and output device further comprises a reload register circuit for sending a new setting value to the comparison and coincidence register circuit each time the setting value stored in the comparison and coincidence register circuit agrees with the value of the count signal.

Accordingly, the setting value of the comparison and coincidence register circuit can be rewritten without performing the interruption operation of the central processing unit or using the direct memory accessing transfer function. Also, in cases where a data transfer rate of the transmission data is too high to perform the interruption operation of the central processing unit or to use the direct memory accessing transfer function, the writing of the setting value using the reload register circuit is useful.

It is preferred that a data input and output device further comprises an adder for adding a prescribed value to the setting value stored in the comparison and coincidence register circuit to store a new setting value in the comparison and coincidence register circuit each time the setting value stored in the comparison and coincidence register circuit agrees with the value of the count signal.

Accordingly, the setting value of the comparison and coincidence register circuit can be automatically rewritten without performing the interruption operation of the central processing unit or using the direct memory accessing transfer function.

It is preferred that the value of the count signal counted by the timer circuit is incremented, and the value of the count signal is reset to zero.

Accordingly, an operation of the timer circuit can be reliably performed.

DETAILED DESCRIPTION OF THE PREFERRED EMBODIMENTS

Embodiments of the present invention will now be described with reference to the accompanying drawings.
Embodiment 1

Figure 1:
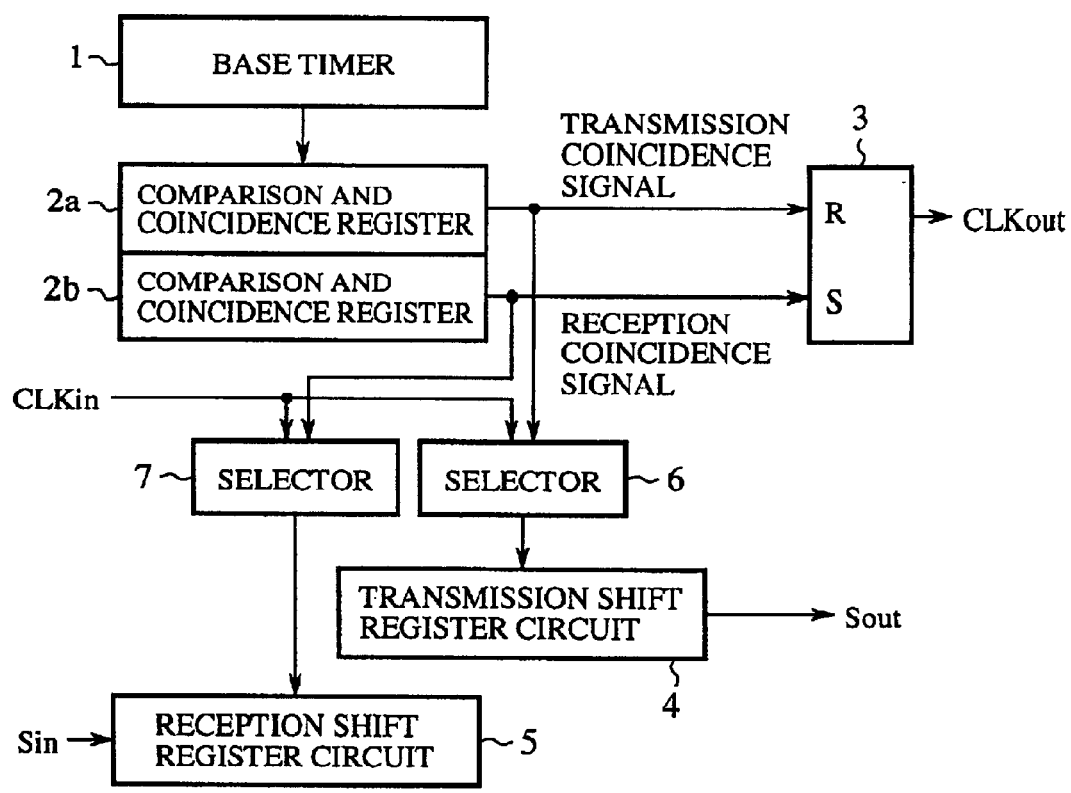
FIG. 1 is a block diagram showing the configuration of a data input and output device according to a first embodiment of the present invention.

FIG. 1 is a block diagram showing the configuration of a data input and output device according to a first embodiment of the present invention. In FIG. 1, 1 indicates a base timer (or a timer circuit). In the base timer 1, a count operation is started to increment a value of a control signal by using a control signal sent from a central processing unit (CPU) (not shown) or a clock signal sent from the outside as a trigger, and the incremented value of the count signal is output every prescribed time period. Also, the value of the count signal is reset to zero each time the value of the count signal reaches a prescribed value. 2a indicates a comparison and coincidence register (a comparison and coincidence register circuit, or a transmission comparison and coincidence register circuit). In the comparison and coincidence register 2a, a setting value corresponding to each shift time in the data transmission is stored, and the setting value is compared with the value of the count signal output from the base timer 1. In cases where the setting value agrees with the value of the count signal, a transmission coincidence signal set to "1" (high level) is output from the comparison and coincidence register 2a. 2b indicates a comparison and coincidence register (a comparison and coincidence register circuit, or a reception comparison and coincidence register circuit). In the comparison and coincidence register 2b, a setting value corresponding to each shift time in the data reception is stored, and the setting value is compared with the value of the count signal output from the base timer 1. In cases where the setting value agrees with the value of the count signal, a reception coincidence signal set to "1" (high level) is output from the comparison and coincidence register 2b. 3 indicates an RS flip flop (or a flip-flop circuit). In the RS flip flop 3, the transmission coincidence signal and the reception coincidence signal are received from the comparison and coincidence registers 2a and 2b, a logical value of a clock signal CLKout is set to "1" when the logical value of the reception coincidence signal is set to "1" on condition that the logical value of the transmission coincidence signal is not set to "1", and a logical value of the clock signal CLKout is reset to "0" when the logical value of the transmission coincidence signal is set to "1" on condition that the logical value of the reception coincidence signal is not set to "1".

6 indicates a selector (or a clock selecting circuit). In the selector 6, either a clock signal CLKin sent from the outside or the transmission coincidence signal of the comparison and coincidence register 2a is selected as a data shift clock signal. 4 indicates a transmission shift register circuit (or a data shift register circuit). In the transmission shift register circuit 4, a shift operation is performed for each piece of transmission data in synchronization with the data shift clock signal of the selector 6, and transmission data Sout is output from the transmission shift register circuit 4. 7 indicates a selector (or a clock selecting circuit). In the selector 7, either the clock signal CLKin sent from the outside or the reception coincidence signal of the comparison and coincidence register 2b is selected as a data shift clock signal. 5 indicates a reception shift register circuit (or a data shift register circuit). In the reception shift register circuit 5, a shift operation is performed for each piece of reception data in synchronization with the data shift clock signal of the selector 7, and reception data Sin is received and sampled.

Next, an operation of the data input and output device is described.

Figure 2:
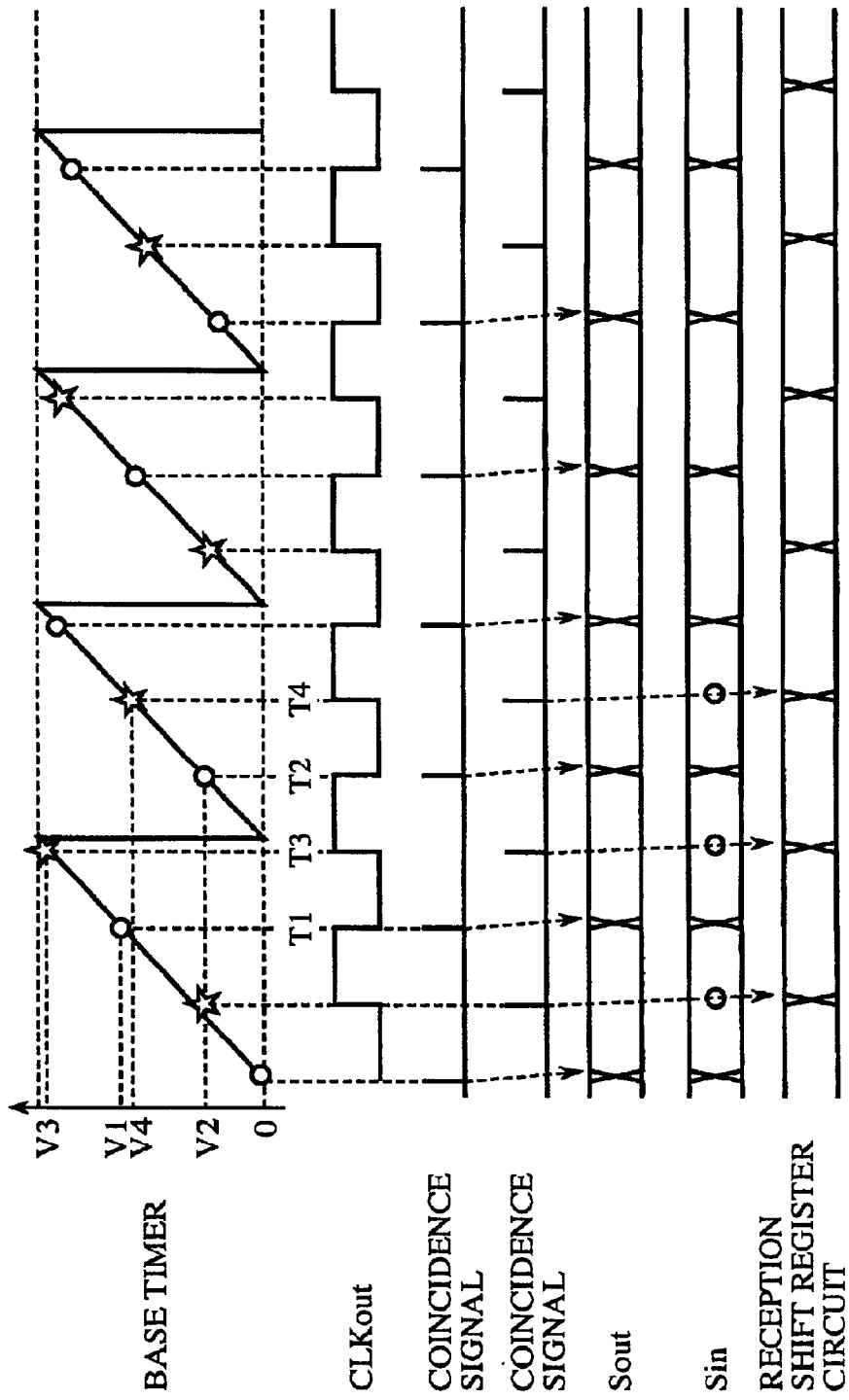
FIG. 2 is a timing chart of the data transmission and reception performed in the data input and output device shown in FIG. 1.

FIG. 2 is a timing chart of the data transmission and reception performed in the data input and output device. In this embodiment, a data transmission performed on a transmission side in synchronization with a clock signal CLKout produced in the data input and output device of the transmission side and a data reception performed on a reception side in synchronization with a clock signal CLKout produced in the data input and output device of the reception side are described with reference to FIG. 2. That is, the transmission coincidence signal of the comparison and coincidence register 2a is selected in the selector 6, and a shift operation is performed in the transmission shift register circuit 4 in synchronization with the transmission coincidence signal. Also, the reception coincidence signal of the comparison and coincidence register 2b is selected in the selector 7, and a shift operation is performed in the reception shift register circuit 5 in synchronization with the reception coincidence signal.

The data transmission performed on the transmission side is initially described. A central processing unit (CPU) not shown writes a setting value, which corresponds to each shift time of the transmission shift register circuit 4, in the comparison and coincidence register 2a. In detail, a first value V1 of a count signal, which is to be output from the base timer 1 at a first shift time T1, is calculated in advance in the CPU, and the first value V1 is stored in the comparison and coincidence register 2a as a setting value. The first value V1 is indicated by a first circle symbol placed on a count signal of the base timer shown in FIG. 2.

Thereafter, a count operation of the base timer 1 is started by using a control signal sent from the CPU as a trigger, the value of the count signal is reset to zero for each count resetting time, and the value of the count signal is output to the comparison and coincidence register 2a for each prescribed time. In the comparison and coincidence register 2a, the value of the count signal is compared with the setting value. When the value of the count signal agrees with the setting value, the transmission coincidence signal set to "1" is output from the comparison and coincidence register 2a to the RS flip-flop 3 and the selector 6. Also, the transmission coincidence signal is sent to the CPU (not shown) as an interruption request signal.

In the selector 6, a clock signal CLKin sent from the outside and the transmission coincidence signal are received, and the transmission coincidence signal is selected. Thereafter, the transmission coincidence signal is sent to the transmission shift register circuit 4. When the transmission coincidence signal is received in the transmission shift register circuit 4, a shift operation is performed in a transmission shift register of the transmission shift register circuit 4, and transmission data Sout is output from the transmission shift register circuit 4. Thereafter, the CPU, which receives the interruption request signal, writes a second value V2 of a count signal, which is to be output from the base timer 1 at a next shift time T2, in the comparison and coincidence register 2a as another setting value. The second value V2 is indicated by a next circle symbol placed on a count signal of the base timer shown in FIG. 2. A time interval between each pair of shift times adjacent to each other is set to a constant value.

Therefore, in cases where the writing of the setting value and the comparison and coincidence between the setting value and the value of the count signal are repeated, the shift operations can be performed in the transmission shift register circuit 4 at a constant repetition period, and the transmission data Sout can be output from the data input and output device at a constant repetition period.

In cases where the transmission data Sout is received on a reception side, a synchronization clock signal is required on the reception side. In this embodiment, the clock signal CLKout produced in the RS flip-flop 3 of the transmission side is used as the synchronization clock signal on the reception side. In this case, because the CPU of the reception side receives the clock signal CLKout in which the shift times of the shift operations of the transmission shift register circuit 4 of the transmission side are recorded, the shift time of each shift operation of the reception shift register circuit 5 of the reception side is, for example, set by the CPU to a middle time between each pair of adjacent shift times of the shift operations of the transmission shift register circuit 4 of the transmission side, and the setting value corresponding to the shift time of each shift operation of the reception shift register circuit 5 of the reception side is stored in the comparison and coincident register 2b under control of the CPU.

Accordingly, in cases where the setting value corresponding to each shift time of the transmission shift register circuit 4 is freely set and is stored in the comparison and coincidence register 2a according to a data transmission and reception program executed in the CPU, the shift operations can be performed at a desired repetition period in a transmission shift register of the transmission shift register circuit 4, and the transmission data Sout can be output from the data input and output device at the desired repetition period.

Next, the data reception performed on the reception side is described. Because the clock signal CLKout produced in the RS flip-flop 3 of the reception side is used as a synchronization clock signal of the data reception performed on the reception side, the pieces of reception data Sin are sent from the transmission shift register circuit 4 of the transmission side to the reception shift register circuit 5 of the reception side in synchronization with the clock signal CLKout. Also, a CPU (not shown) of the reception side receives the clock signal CLKout and writes a setting value, which corresponds to each shift time of the reception shift register circuit 5, in the comparison and coincidence register 2b according to the clock signal CLKout. In detail, a third value V3 of a count signal, which is to be output from the base timer 1 at a first shift time T3, is calculated in advance in the CPU, and the third value V3 is stored in the comparison and coincidence register 2b as a setting value. The third value V3 is indicated by a star symbol placed on a count signal of the base timer shown in FIG. 2.

Thereafter, a count operation of the base timer 1 is started by using a control signal sent from the CPU as a trigger, the value of the count signal is reset to zero for each count resetting time, and the value of the count signal is output to the comparison and coincidence register 2b for each prescribed time. In the comparison and coincidence register 2b, the value of the count signal is compared with the setting value. When the value of the count signal agrees with the setting value, the reception coincidence signal set to "1" is output from the comparison and coincidence register 2b to the RS flip-flop 3 and the selector 7. Also, the reception coincidence signal is sent to the CPU (not shown) as an interruption request signal.

In the selector 7, a clock signal CLKin sent from the outside and the reception coincidence signal are received, and the reception coincidence signal is selected. Thereafter, the reception coincidence signal is sent to the reception shift register circuit 5. When the reception coincidence signal is received in the reception shift register circuit 5, a shift operation is performed in a reception shift register of the reception shift register circuit 5, and reception data Sin is received and sampled. Thereafter, the CPU, which receives the interruption request signal, writes a fourth value V4 of a count signal, which is to be output from the base timer 1 at a next shift time T4, in the comparison and coincidence register 2b as another setting value. The fourth value V4 is indicated by a next star symbol placed on the count signal of the base timer shown in FIG. 2. A time interval between each pair of shift times adjacent to each other is set to a constant value. A value indicated by a next star symbol which is placed on a count signal of the base timer shown in FIG. 2.

Therefore, in cases where the writing of the setting value and the comparison and coincidence between the setting value and the value of the count signal are repeated, the shift operations can be performed in the reception shift register circuit 5 at a constant repetition period, and the reception data Sin can be received and sampled at a constant repetition period.

In cases where the reception data Sin is transmitted from a transmission side, a synchronization clock signal is required on the transmission side. In this embodiment, the clock signal CLKout produced in the RS flip-flop 3 of the reception side is used as the synchronization clock signal on the transmission side. In this case, because the CPU of the transmission side receives the clock signal CLKout in which the shift times of the shift operations of the reception shift register circuit 5 of the reception side are recorded, the shift time of each shift operation of the transmission shift register circuit 4 of the transmission side is, for example, set by the CPU to a middle time between each pair of adjacent shift times of the shift operations of the reception shift register circuit 5 of the reception side, and the setting value corresponding to the shift time of each shift operation of the transmission shift register circuit 4 of the transmission side is stored in the comparison and coincident register 2a under control of the CPU.

Accordingly, in cases where the setting value corresponding to each shift time of the transmission shift register circuit 4 is freely set and is stored in the comparison and coincidence register 2b according to a data transmission and reception program executed in the CPU, the shift operations can be performed at a desired repetition period in a reception shift register of the reception shift register circuit 5, and the reception data Sin can be received and sampled at the desired repetition period. Therefore, even though the reception data Sin is transmitted from the transmission side to the reception side without synchronizing with the clock signal CLKout, the reception data Sin can be correctly received by appropriately changing each setting value which corresponds to the shift time and are written in the comparison and coincident register 2b.

Also, the clock signal CLKout produced in the RS flip-flop 3 of the transmission side (or the reception side) is used as a synchronization clock signal on the transmission and reception sides to transmit and receive the data. However, it is applicable that the clock signal CLKin sent from the outside be selected in the selectors 6 and 7 as a synchronization clock signal to transmit the data from the transmission shift register circuit 4 and to receive data in the reception shift register circuit 5. In this case, the data transmission and reception is performed in the transmission shift register circuit 4 and the reception shift register circuit 5 in the same manner as in the conventional serial data input and output device by using the clock signal CLKin sent from the outside as a data shift clock signal.

Next, the comparison and coincidence registers 2a and 2b, the transmission shift register circuit 4 and the reception shift register circuit 5 of the data input and output device are described in detail.

Figure 3:
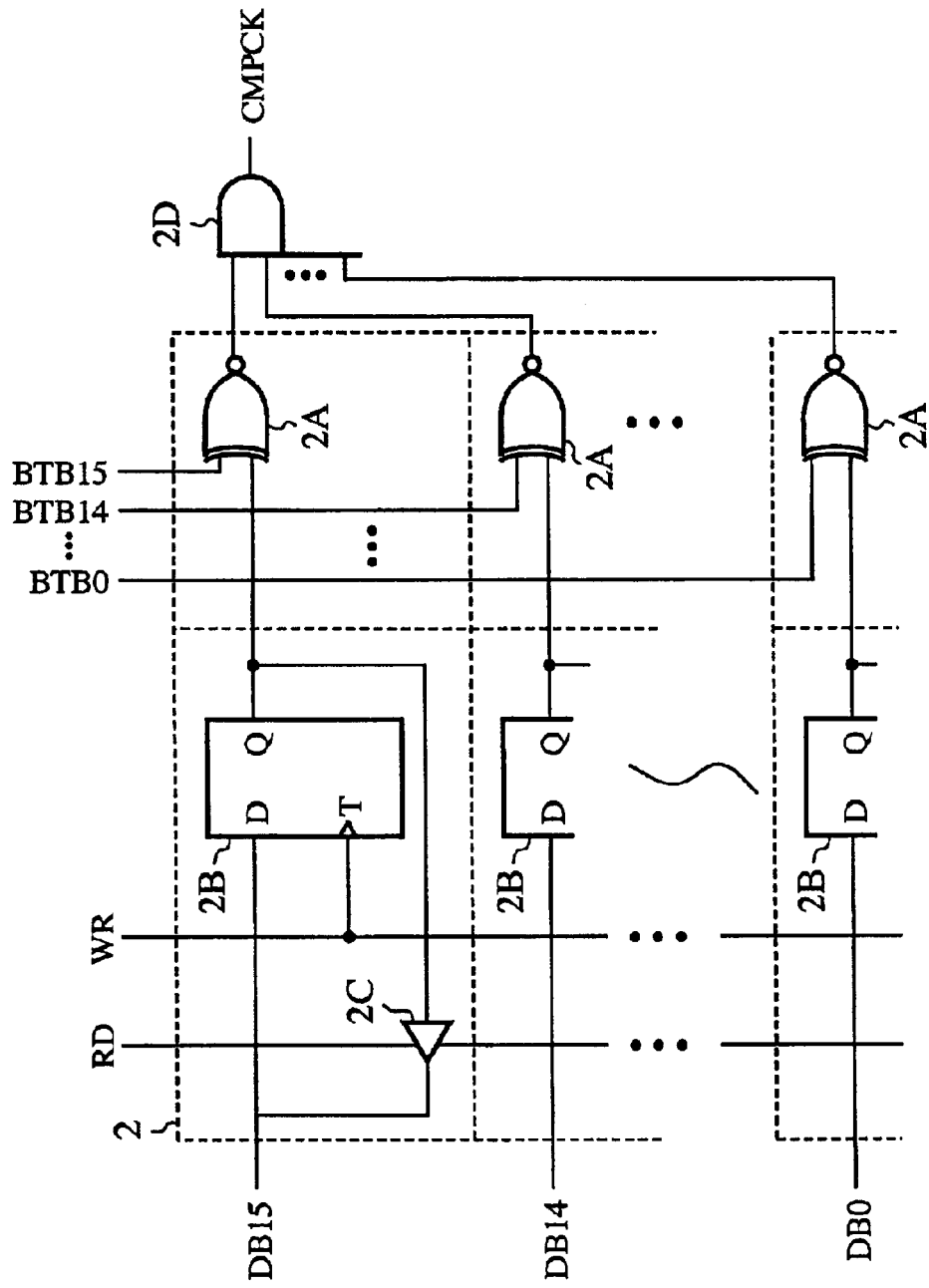
FIG. 3 is a circuit view of each comparison and coincidence register of the data input and output device according to the first embodiment.

FIG. 3 is a circuit view of each of the comparison and coincidence registers 2a and 2b of the data input and output device according to the first embodiment. In FIG. 3, 2 indicates a comparison and coincidence register (or comparison and coincidence register circuit) representing the comparison and coincidence registers 2a and 2b. 16-bit length data is stored in the comparison and coincidence register 2. DB0 to DB15 indicate 16 data buses. The setting value corresponding to each shift time is calculated in the CPU (not shown) and is sent to the comparison and coincidence register 2 through the data buses DB0 to DB15 as 16-bit length data. The comparison and coincidence register 2 is divided into 16 blocks arranged in parallel to each other, and each of 16 bit values expressing the setting value is input to the corresponding block. BTB0 to BTB15 indicate a value of the count signal output from the base timer 1, the count signal has the value expressed by 16 bit values BTB0 to BTB15, and each bit value BTB0, BTB1, - - -, or BTB15 is input to the corresponding block. 2B indicates a data latch arranged in each block. Each bit value of the setting value transmitting through the data buses DB0 to DB15 is latched in the data latch 2B. 2A indicates a logical coincidence element arranged in each block. A value of a data output terminal Q of the data latch 2B and one bit value BTB0, BTB1, - - - , or BTB15 are received in the logical coincidence element 2A, and data set to "1" is output from the logical coincidence element 2A in cases where the value of the data output terminal Q of the data latch 2B agrees with the bit value BTB0, BTB1, - - - , or BTB15. 2C indicates a try state buffer arranged in each block. When a read out signal RD is set to an active state, the value of the data output terminal Q of the data latch 2B is output to the data bus DB0, DB1, - - - , or DB15. 2D indicates an AND gate. In the AND gate 2D, 16 pieces of data output from the logical coincidence elements 2A are received, and a coincidence signal CMPACK is output. In cases where the 16 pieces of data are set to the same logical value "1", the coincidence signal CMPACK is set to the logical value "1". The coincidence signal CMPACK corresponds to the transmission coincidence signal of the comparison and coincidence register 2a or the reception coincidence signal of the reception and coincidence register 2b.

Next, an operation of the comparison and coincidence registers 2 will be described below.

When a write-in signal WR sent from the CPU (not shown) is input to a timing input terminal T of each data latch 2B, 16 bit values of the setting value corresponding to the shift time are input to data input terminals D of the data latches 2B through the data buses DB0 to DB15. Thereafter, 16 bit values output from the data output terminals Q of the data latches 2B are input to the first terminals of the logical coincidence elements 2A. Also, when a read-out signal RD sent from the CPU (not shown) is input to the try state buffers 2C, the 16 bit values of the data output terminals Q of the data latches 2B are output to the data buses DB0 to DB15 through the try state buffers 2C. Because the 16 bit values of the data output terminals Q of the data latches 2B correspond to the setting value, data stored in the comparison and coincidence registers 2 can be confirmed.

Also, 16 bit values BTB0 to BTB15 indicating the count signal of the base timer 1 are input to the second terminals of the logical coincidence elements 2A. Therefore, one bit value of the count signal of the base timer 1 is compared with the corresponding bit value of the setting value in each logical coincidence element 2A. When the bit value of the count signal of the base timer 1 agrees with the corresponding bit value of the setting value, data set to "1" (high level) is output from the logical coincidence element 2A.

In the AND gate 2D, 16 pieces of data output from the logical coincidence elements 2A are received, and a logical multiply for the 16 pieces of data is calculated. Therefore, in cases where each of the 16 bit values of the count signal of the base timer 1 agrees with the corresponding bit value of the setting value, the coincidence signal CMPACK set to the logical value "1" (high level) is output from the AND gate 2D. In contrast, in cases where at least one of the 16 bit values of the count signal of the base timer 1 does not agree with the corresponding bit value of the setting value, the coincidence signal CMPACK set to the logical value "0" (low level) is output from the AND gate 2D. Therefore, the comparison and coincidence register 2 can function as each of the comparison and coincidence registers 2a and 2b.

Figure 4:
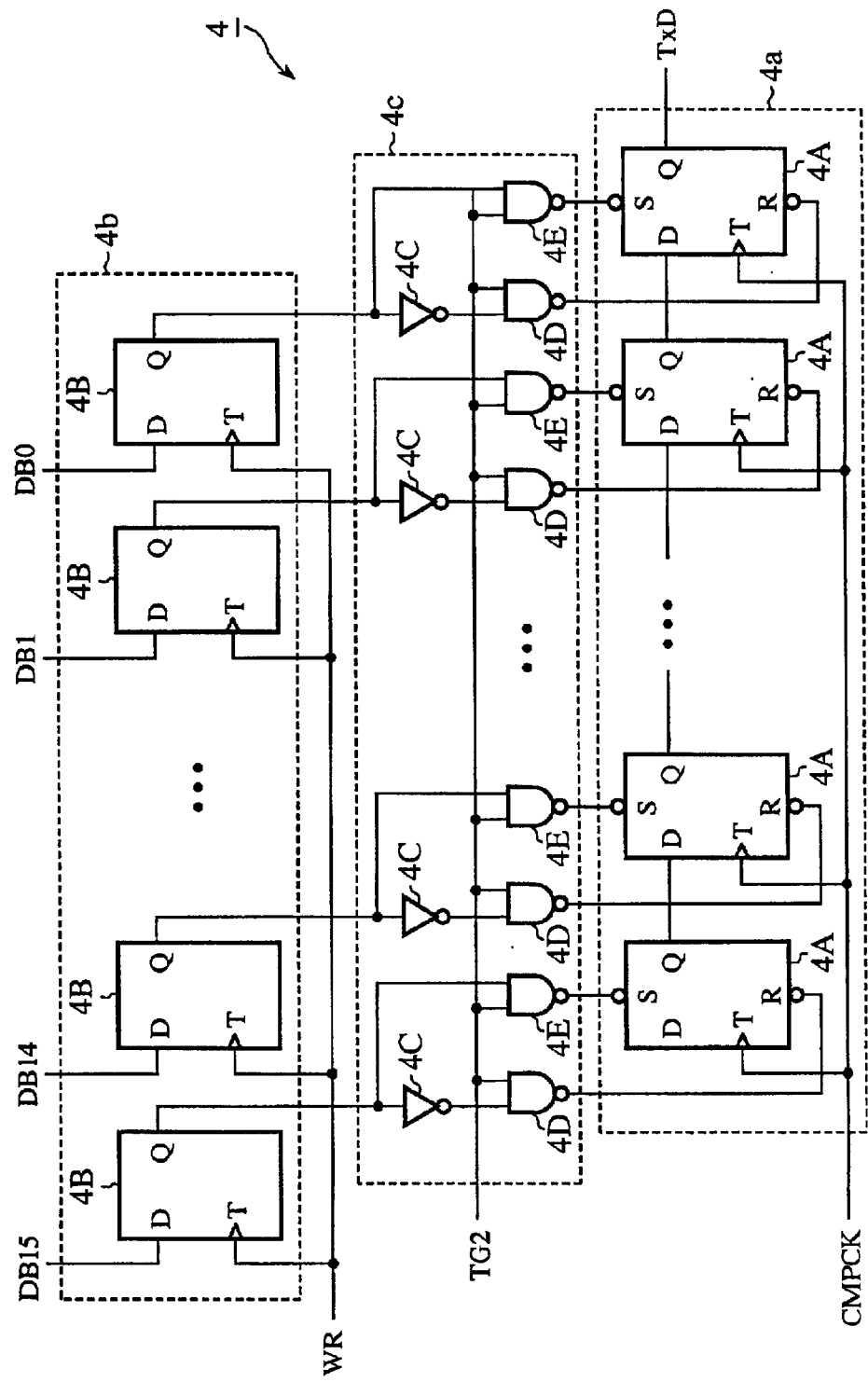
FIG. 4 is a circuit view of a transmission shift register circuit of the data input and output device according to the first embodiment.

FIG. 4 is a circuit view of the transmission shift register circuit 4 of the data input and output device according to the first embodiment. In FIG. 4, 4a indicates a transmission shift register (or a data shift register circuit) of the transmission shift register circuit 4. In the transmission shift register 4a, transmission data TxD is output in synchronization with the coincidence signal CMPACK output from the comparison and coincidence register 2 through the selector 6. 4b indicates a transmission buffer register (or the data shift register circuit) of the transmission shift register circuit 4. In the transmission buffer register 4b, transmission data of 16-bit length transmitted through the data buses DB0 to DB15 is temporarily stored. 4c indicates a write-in circuit (or the data shift register circuit) of the transmission shift register circuit 4. In the write-in circuit 4c, the transmission data temporarily stored in the transmission buffer register 4b is written in the transmission shift register 4a.

4B indicates each of 16 data latches arranged in the transmission buffer register 4b. In the data latches 4B, bit values of transmission data transmitted through the data buses DB0 to DB15 are input to data input terminals D in synchronization with a write-in signal WR input to timing input terminals T, and bit values of transmission data are output from data output terminals Q.

4C indicates each of 16 NOT gates arranged in the write-in circuit 4c. Each of bit values of transmission data output from the data output terminals Q of the data latches 4B is received in the corresponding NOT gate 4C, and an inverted bit value is output from the NOT gate 4C. 4D indicates each of 16 NAND gates arranged in the write-in circuit 4c. The inverted bit value of each NOT gate 4C and a timing signal TG2 are received in the corresponding NAND gate 4D, and a reset signal is output from the NAND gate 4D. 4E indicates each of 16 NAND gates arranged in the write-in circuit 4c. Each of bit values of transmission data output from the data output terminals Q of the data latches 4B and the timing signal TG2 are received in the corresponding NAND gate 4E, and a set signal is output from the NAND gate 4E.

4A indicates each of 16 data latches arranged in the transmission shift register 4a. The coincidence signal CMPACK output from the comparison and coincidence register 2 is input to a timing input terminal T of each data latch 4A, a signal output from an output terminal Q of the data latch 4A is reset to "0" when the reset signal of a logical value "1" sent from the NAND gate 4D is input to a reset input terminal R, and the signal output from the output terminal Q of the data latch 4A is set to a logical value "0" or "1" when a set signal of a logical value "1" sent from the NAND gate 4E is input to a set input terminal S.

Next, an operation of the transmission shift register circuit 4 will be described below.

When a write-in signal WR sent from the CPU (not shown) is input to the timing input terminals T of the data latches 4B, bit values of transmission data transmitted through the data buses DB0 to DB15 are written in the data input terminals D of the data latches 4B. Thereafter, the transmission data written in the data latches 4B is sent to the NOT gates 4C and NAND gates 4E through the data output terminals Q.

When a timing signal TG2 set to a logical value "1" (high level) and a bit value of a logical value "0" (low level) sent from the data output terminal Q of each data latch 4B are received in both the corresponding NOT gate 4C and the corresponding NAND gate 4E, the bit value of the transmission data sent from the data latch 4B is inverted in the NOT gate 4C, and an inverted bit value of a logical value "1" (high level) is sent to the corresponding NAND gate 4D. Also, a set signal set to a logical value "1" (high level) is output from the NAND gate 4E to the corresponding data latch 4A. Therefore, a signal output from the output terminal Q of the data latch 4A is reset to "0". In the same manner, because the timing signal TG2 set to the logical value "1" and the inverted bit value of the logical value "1" (high level) sent from the NOT gate 4C are received in the NAND gate 4D, a reset signal set to a logical value "0" (low level) is output from the NAND gate 4D to the data latch 4A. Therefore, the signal output from the output terminal Q of the data latch 4A is not reset.

In contrast, when the timing signal TG2 set to the logical value "1" (high level) and a bit value of a logical value "1" (high level) sent from the data output terminal Q of each data latch 4B are received in both the corresponding NOT gate 4C and the corresponding NAND gate 4E, the bit value of the transmission data sent from the data latch 4B is inverted in the NOT gate 4C, and an inverted bit value of a logical value "0" (low level) is sent to the corresponding NAND gate 4D. Also, a set signal set to a logical value "0" (low level) is output from the NAND gate 4E to the corresponding data latch 4A. Therefore, a signal output from the output terminal Q of the data latch 4A is set to "1". In the same manner, because the timing signal TG2 set to the logical value "1" and the inverted bit value of the logical value "0" (low level) sent from the NOT gate 4C are received in the NAND gate 4D, a reset signal set to a logical value "1" (high level) is output from the NAND gate 4D to the data latch 4A. Therefore, the signal output from the output terminal Q of the data latch 4A is maintained.

As is described above, the output terminal Q of each data latch 4A is set to the logical value "0" or "1" SO as to write the transmission data of the transmission buffer register 4b in the transmission shift register 4a. When the output terminals Q of all the data latches 4A are set to the logical value "0" or "1" according to the transmission data of the transmission buffer register 4b, the data transmission from the transmission shift register 4a is started. In detail, when the value of the count signal of the base timer 1 agrees with the setting value of the comparison and agreement register 2, the coincidence signal CMPCK of the logical value "1" is sent from the comparison and agreement register 2 to the transmission shift register 4a through the selector 6. Thereafter, each time the coincidence signal CMPCK of the logical value "1" is input to the timing input terminals T of the data latches 4A, a shift operation is performed in the transmission shift register 4a, and the transmission data TxD is output.

Figure 5:
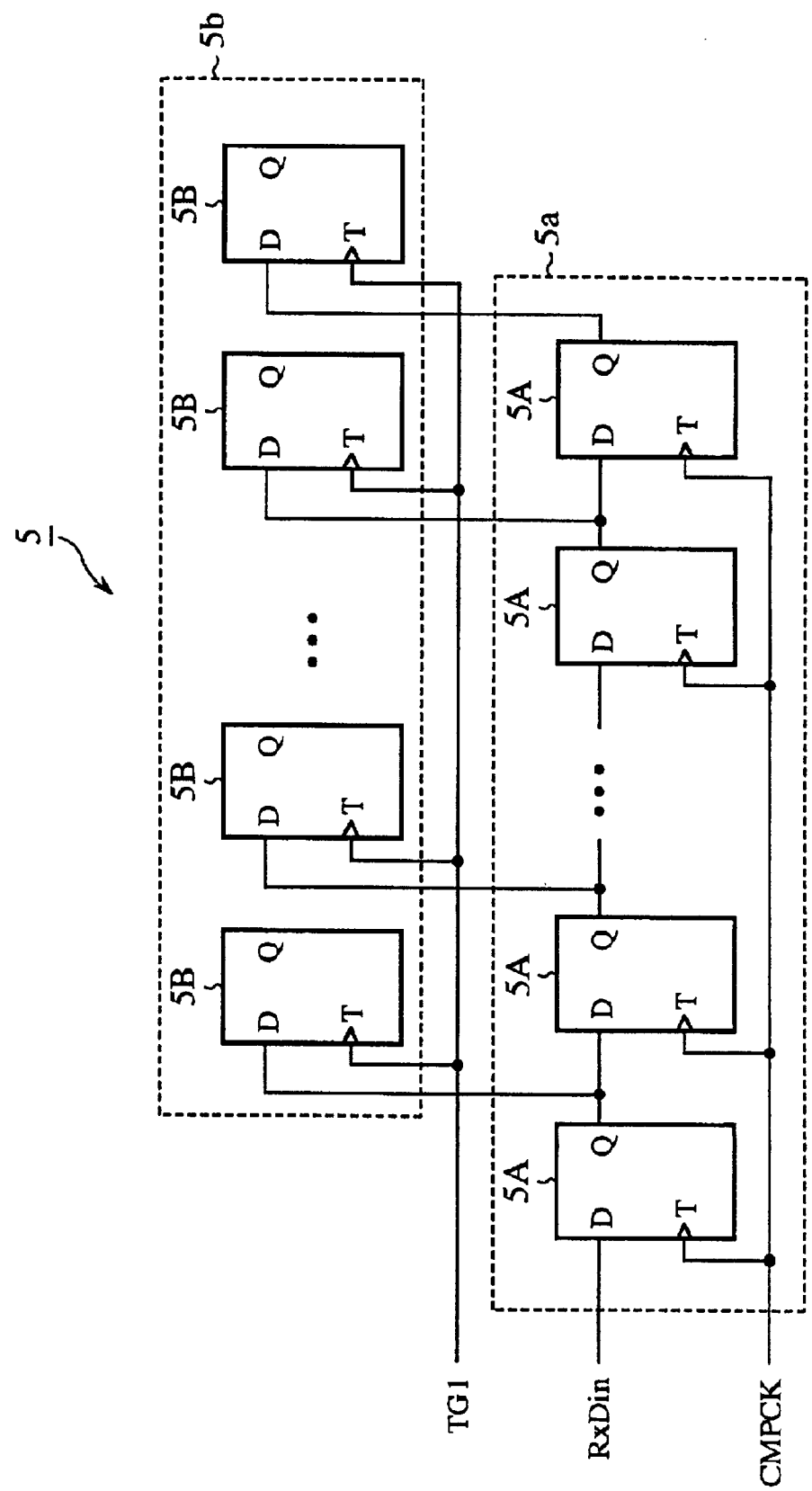
FIG. 5 is a circuit view of a reception shift register circuit of the data input and output device according to the first embodiment.

FIG. 5 is a circuit view of the reception shift register circuit 5 of the data input and output device according to the first embodiment. In FIG. 5, 5a indicates a reception shift register (or a data shift register circuit) of the reception shift register circuit 5. In the reception shift register 5a, each of bit values of reception data RxDin is repeatedly received and shifted in synchronization with the coincidence signal CMPCK of the comparison and agreement register 2, and the reception data RxDin stored by performing a prescribed number of shift operations is output. 5b indicates a reception buffer register (or the data shift register circuit) of the reception shift register circuit 5. In the reception buffer register 5b, the reception data RxDin received in the reception shift register 5a is stored. That is, when a reception completion timing signal TG1 indicating the reception completion of the reception data RxDin is received in the reception buffer register 5b, the reception data RxDin is received from the reception shift register 5a and is stored.

5A indicates each of a plurality of data latches of the reception shift register 5a. When the coincidence signal CMPCK of the comparison and agreement register 2 is received in timing input terminals T of the data latches 5A, the bit values of the reception data RxDin are received in data input terminals D of the data latches 5A. 5B indicates each of a plurality of data latches of the reception buffer register 5b. When the reception completion timing signal TG1 is received in timing input terminals T of the data latches 5B, the bit values of the reception data RxDin received in the reception shift register 5a are input to data input terminals D of the data latches 5B.

Next, an operation of the reception shift register circuit 5 will be described below.

When the reception coincidence signal CMPCK of a logical value "1" (high level), which is produced in the comparison and agreement register 2 and is selected in the selector 7, is received in the timing input terminals T of the data latches 5A of the reception shift register 5a, each of the bit values of the reception data RxDin is repeatedly received in the data input terminal D of the top data latch 5A while performing a shift operation in each data latch 5A, and the bit values of the reception data RxDin are written in the data latches 5A. Thereafter, when a prescribed number of shift operations are performed in the data latches 5A, the CPU (not shown) detects the reception completion of the reception data RxDin and sends the reception completion timing signal TG1 to the timing input terminals T of the data latches 5B of the reception buffer register 5b, and the bit values of the reception data RxDin written in the data latches 5A are output from data output terminals Q of the data latches 5A and are input to the data input terminals D of the data latches 5B of the reception buffer register 5b. Therefore, the reception data RxDin received in the reception shift register 5a is stored in the reception buffer register 5b.

As is described above, in the first embodiment, each time the value of the count signal of the base timer 1 agrees with the setting value which corresponds to one shift time (or transmission or reception timing) of data in the transmission shift register circuit 4 or the reception shift register circuit 5 and is stored in the transmission comparison and coincidence register 2a or the reception comparison and coincidence register 2b, the transmission coincidence signal or the reception coincidence signal is output to the transmission shift register circuit 4 or the reception shift register circuit 5, and the data transmission or the data reception is performed in the transmission shift register circuit 4 or the reception shift register circuit 5. Accordingly, the data transmission and reception timing in the transmission shift register circuit 4 and the reception shift register circuit 5 can be freely changed by setting a desired setting value in the transmission comparison and coincidence register 2a and the reception comparison and coincidence register 2b. Also, the timer function of the base timer 1 can be used to transmit and receive data, and the number of elements required in the data input and output device can be reduced in hardware.

Also, in the first embodiment, the transmission coincidence signal and/or the reception coincidence signal output from the transmission comparison and coincidence register 2a and/or the reception comparison and coincidence register 2b are received in the RS flip-flop 3, and the clock signal CLKout is output from the RS flip-flop 3 to perform the data transmission and reception. Accordingly, the clock signal CLKout of the data transmission and reception can be freely changed by setting a desired setting value in the transmission comparison and coincidence register 2a and/or the reception comparison and coincidence register 2b. Also, the timer function of the base timer 1 can be used to transmit and receive data, and the number of elements required in the data input and output device can be reduced in hardware.

Embodiment 2

Figure 6:
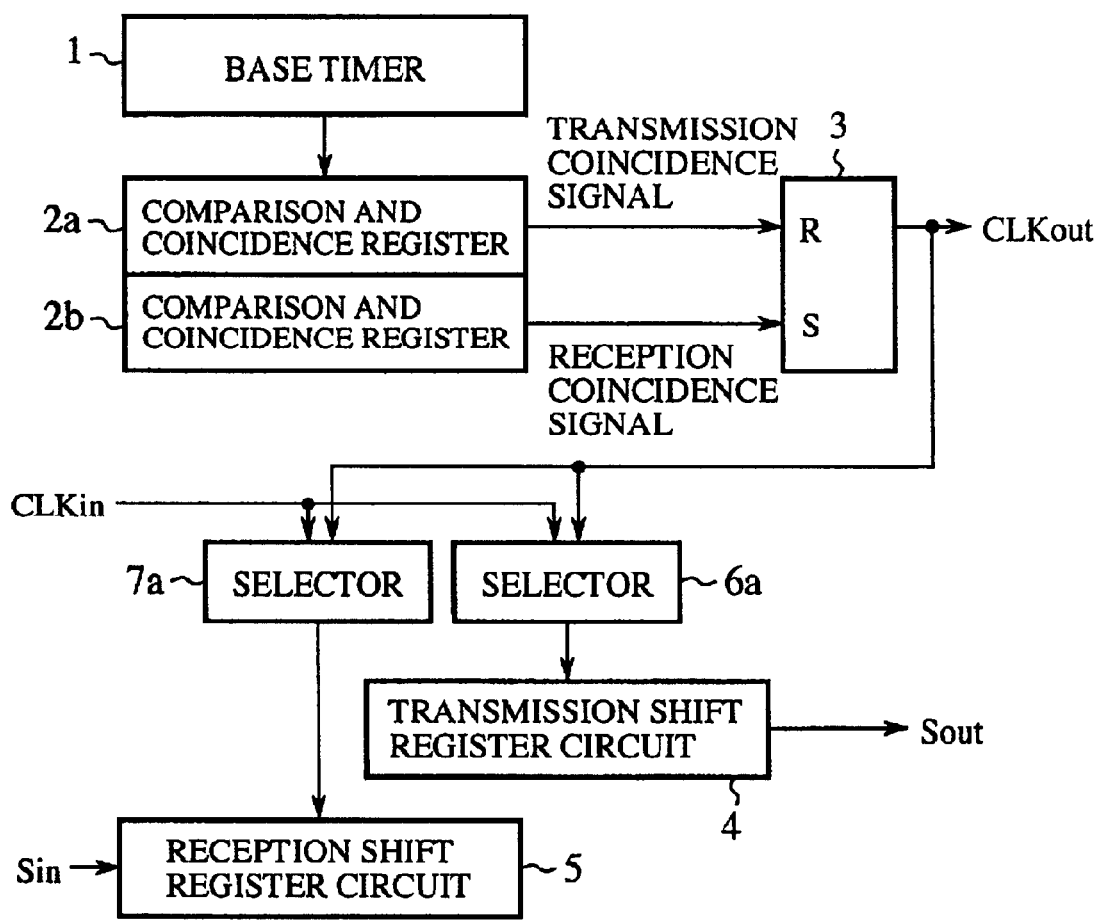
FIG. 6 is a block diagram showing the configuration of a data input and output device according to a second embodiment of the present invention.

FIG. 6 is a block diagram showing the configuration of a data input and output device according to a second embodiment of the present invention. In FIG. 6, 6a indicates a selector (or a clock selecting circuit). In the selector 6a, either a clock signal CLKin sent from the outside or the clock signal CLKout output from the RS flip-flop 3 is selected as a data shift clock signal and is sent to the transmission shift register circuit 4. 7a indicates a selector (or the clock selecting circuit). In the selector 7a, either the clock signal CLKin sent from the outside or the clock signal CLKout output from the RS flip-flop 3 is selected as a data shift clock signal and is sent to the reception shift register circuit 5. The constituent elements, which are the same as those shown in FIG. 1, are indicated by the same reference numerals as those of the constituent elements shown in FIG. 1, and additional description of these constituent elements is omitted.

Next, an operation of the data input and output device will be described below.

Figure 7:
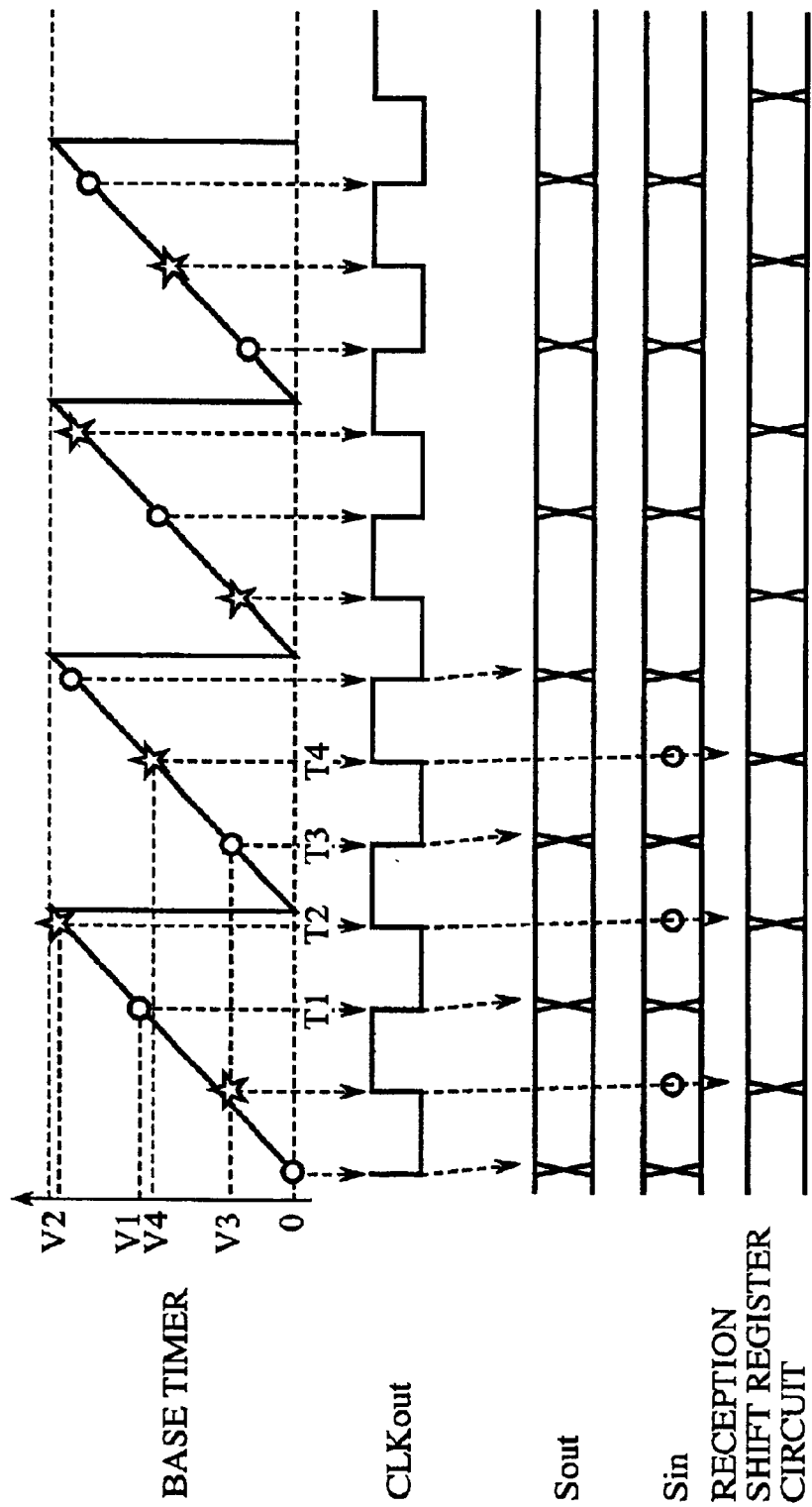
FIG. 7 is a timing chart of the data transmission and reception performed in the data input and output device shown in FIG. 6.

FIG. 7 is a timing chart of the data transmission and reception performed in the data input and output device according to the second embodiment.

In the second embodiment, the data transmission and reception is performed in synchronization with the clock signal CLKout produced in the data input and output device. That is, the clock signal CLKout produced in the RS flip-flop 3 is selected in the selectors 6a and 7a and is output to the transmission shift register circuit 4 and the reception shift register circuit 5. Also, because a synchronization clock signal is required on a reception side (or a transmission side) to perform the data transmission and reception between the transmission and reception sides, the clock signal CLKout produced in the RS flip-flop 3 of the transmission side (or the reception side) is used on the reception side (or the transmission side).

In the RS flip-flop 3, when the transmission coincidence signal set to "1" is received from the comparison and coincidence register 2a, a logical value of a signal output from the output terminal of the RS flip-flop 3 is reset to "0". Also, when the reception coincidence signal set to "1" is received from the comparison and coincidence register 2b, a logical value of a signal output from the output terminal of the RS flip-flop 3 is set to "1". Therefore, a clock signal CLKout having the logical values "0" and "1" is produced in the RS flip-flop 3 according to the transmission coincidence signal and the reception coincidence signal.

In detail, a value V1 of a count signal to be output from the base timer 1 at a time T1 corresponding to a trailing edge of the clock signal CLKout is calculated in advance in the CPU (not shown), and the value V1 is stored in the comparison and coincidence register 2a as a setting value before the time T1 of the trailing edge. The value V1 is indicated by a circle symbol placed on a count signal of the base timer shown in FIG. 7. Also, a value V2 of a count signal to be output from the base timer 1 at a time T2 corresponding to a leading edge of the clock signal CLKout is calculated in advance in the CPU (not shown), and the value V2 is stored in the comparison and coincidence register 2b as a setting value before the time T2 of the leading edge. The value V2 is indicated by a star symbol placed on the count signal of the base timer shown in FIG. 7.

The data transmission performed on the transmission side is initially described. In the example shown in FIG. 7, the data transmission is performed in synchronization with each trailing edge of the clock signal CLKout of the RS flip-flop 3.

The base timer 1 starts the count operation by using a control signal sent from the CPU as a trigger, and the value of the count signal is reset to zero for each count resetting time, and the value of the count signal is output to the comparison and coincidence registers 2a and 2b for each prescribed time. In the comparison and coincidence register 2a, the value of the count signal is compared with the setting value, and the transmission coincidence signal set to "1" is output to the RS flip-flop 3 each time the value of the count signal agrees with the setting value. Also, in the comparison and coincidence register 2b, the value of the count signal is compared with the setting value, and the reception coincidence signal set to "1" is output to the RS flip-flop 3 each time the value of the count signal agrees with the setting value. Therefore, the clock signal CLKout is produced in the RS flip-flop 3. In addition, each of the transmission coincidence signal set to "1" and the reception coincidence signal set to "1" is sent to the CPU (not shown) as an interruption request signal.

In the selector 6a, a clock signal CLKin sent from the outside and the clock signal CLKout produced in the RS flip-flop 3 are received, and the clock signal CLKout is selected. Thereafter, the clock signal CLKout is sent to the transmission shift register circuit 4. When the clock signal CLKout is received in the transmission shift register circuit 4, a shift operation is performed in the transmission shift register circuit 4 in synchronization with the trailing edge of the clock signal CLKout, and transmission data Sout is output from the transmission shift register circuit 4. Thereafter, the CPU, which receives the transmission coincidence signal as the interruption request signal, writes a value V3 of a count signal at a time T3, which corresponds to a next trailing edge of the clock signal CLKout, in the comparison and coincidence register 2a as another setting value. The value V3 is indicated by a next circle symbol placed on the count signal of the base timer shown in FIG. 7. A time interval between each pair of trailing edges adjacent to each other is set to a constant value.

Accordingly, in cases where the writing of the setting value and the comparison and coincidence between the setting value and the value of the count signal are repeated, the shift operations can be performed in the transmission shift register circuit 4 at a constant repetition period, and the transmission data Sout can be output from the data input and output device at the constant repetition period.

Also, in cases where the setting value corresponding to each shift time of the transmission shift register circuit 4 is freely set and is stored in the comparison and coincidence register 2a according to a data transmission and reception program executed in the CPU, the shift operations can be performed at a desired repetition period in the transmission shift register circuit 4, and the transmission data Sout can be output from the data input and output device at the desired repetition period.

Next, the data reception performed on the reception side is described. In this embodiment, the clock signal CLKout of the RS flip-flop 3 is used as a synchronization clock signal to perform the data reception. Therefore, reception data is transmitted from the transmission side in synchronization with the clock signal CLKout produced on the reception side. Also, in the sample shown in FIG. 7, the data reception is performed in synchronization with each leading edge of the clock signal CLKout produced in the RS flip-flop 3.

The clock signal CLKout is produced in the RS flip-flop 3 in the same manner as in the data transmission. In the selector 7a, the clock signal CLKin sent from the outside and the clock signal CLKout produced in the RS flip-flop 3 are received, and the clock signal CLKout is selected. Thereafter, the clock signal CLKout is sent to the reception shift register circuit 5. When the clock signal CLKout is received in the reception shift register circuit 5, a shift operation is performed in the reception shift register circuit 5 in synchronization with the leading edge of the clock signal CLKout, and reception data Sin is received and sampled in the reception shift register circuit 5. Thereafter, the CPU, which receives the reception coincidence signal as the interruption request signal, writes a value V4 of a count signal, which corresponds to a time T4 of a next leading edge of the clock signal CLKout, in the comparison and coincidence register 2b as another setting value. The value V4 is indicated by a next star symbol placed on the count signal of the base timer shown in FIG. 7.

Accordingly, in cases where the writing of the setting value and the comparison and coincidence between the setting value and the value of the count signal are repeated, the shift operations can be performed in the reception shift register circuit 5 at a constant repetition period, and the reception data Sin can be received and sampled at a constant repetition period.

Also, in cases where the setting value corresponding to each shift time of the transmission shift register circuit 4 is freely set and is stored in the comparison and coincidence register 2b according to a data transmission and reception program executed in the CPU, the shift operations can be performed at a desired repetition period in the reception shift register circuit 5, and the reception data Sin can be received and sampled at the desired repetition period.

Also, the clock signal CLKout produced in the RS flip-flop 3 of the transmission side (or the reception side) is used as a synchronization clock signal on the transmission and reception sides to transmit and receive the data. However, it is applicable that the clock signal CLKin sent from the outside be selected in the selectors 6a and 7a as a synchronization clock signal to transmit the data from the transmission shift register circuit 4 and to receive data in the reception shift register circuit 5. In this case, the data transmission and reception is performed in the transmission shift register circuit 4 and the reception shift register circuit 5 in the same manner as in the conventional serial data input and output device by using the clock signal CLKin sent from the outside as a data shift clock signal.

As is described above, in the second embodiment, each time the value of the count signal of the base timer 1 agrees with the setting value which corresponds to a cycle of a synchronization clock signal and is stored in the transmission comparison and coincidence register 2a, the transmission coincidence signal is output from the transmission comparison and coincidence register 2a and is received in the RS flip-flop 3. Also, each time the value of the count signal of the base timer 1 agrees with the setting value which corresponds to the cycle of the synchronization clock signal and is stored in the reception comparison and coincidence register 2b, the reception coincidence signal is output from the reception comparison and coincidence register 2b and is received in the RS flip-flop 3. Therefore, the clock signal CLKout is produced in the RS flip-flop 3, and the data transmission and reception is performed in the shift registers 4 and 5 by using the clock signal CLKout as a data shift clock signal. Accordingly, the data transmission and reception timing in the transmission shift register circuit 4 and the reception shift register circuit 5 can be freely changed by setting a desired setting value in the transmission comparison and coincidence register 2a and the reception comparison and coincidence register 2b. Also, the timer function of the base timer 1 can be used to transmit and receive data, and the number of elements required in the data input and output device can be reduced in hardware.

In the first and second embodiments, the setting value stored in each of the comparison and coincidence registers 2a and 2b is rewritten by performing the interruption operation of the CPU. However, it is applicable that the setting value be rewritten to another setting value stored in a storing unit according to a direct memory access transfer function without using the CPU. In this case, the load given to the CPU in the setting operation for the comparison and coincidence registers 2a and 2b can be reduced.

Embodiment 3

Figure 8:
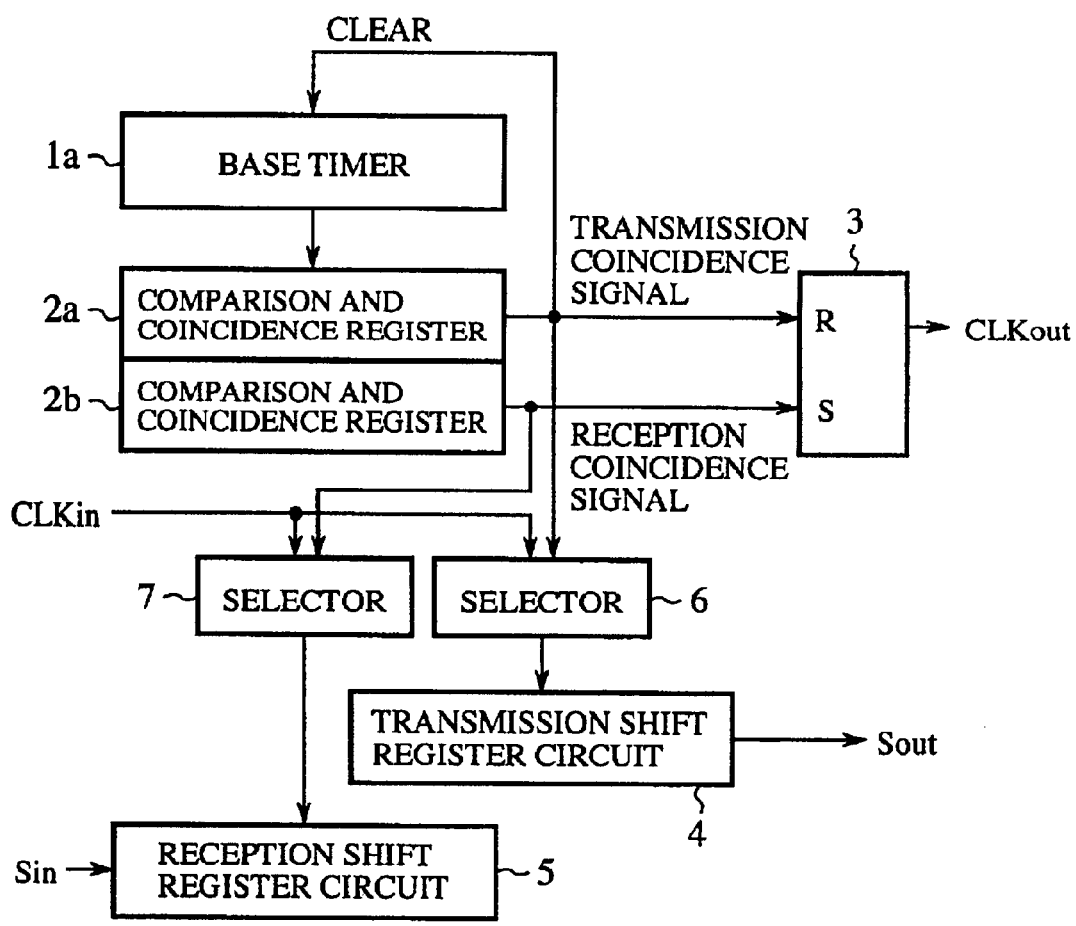
FIG. 8 is a block diagram showing the configuration of a data input and output device according to a third embodiment of the present invention.

FIG. 8 is a block diagram showing the configuration of a data input and output device according to a third embodiment of the present invention. In FIG. 8, 1a indicates a base timer (or a timer circuit). In the base timer 1a, when the transmission coincidence signal set to the logical value "1" (high level) is received from the comparison and coincident register 2a, the count signal, of which the value is counted in the base timer 1a, is cleared to zero. The constituent elements, which are the same as those shown in FIG. 1, are indicated by the same reference numerals as those of the constituent elements shown in FIG. 1, and additional description of these constituent elements is omitted.

Next, an operation of the data input and output device will be described below.

In the third embodiment, the data transmission and reception is performed in synchronization with the clock signal CLKout produced in the data input and output device. That is, the transmission coincidence signal of the comparison and coincident register 2a is selected in the selector 6 and is sent to the transmission shift register circuit 4, and the reception coincidence signal of the comparison and coincident register 2b is selected in the selector 7 and is sent to the reception shift register circuit 5.

Figure 9:
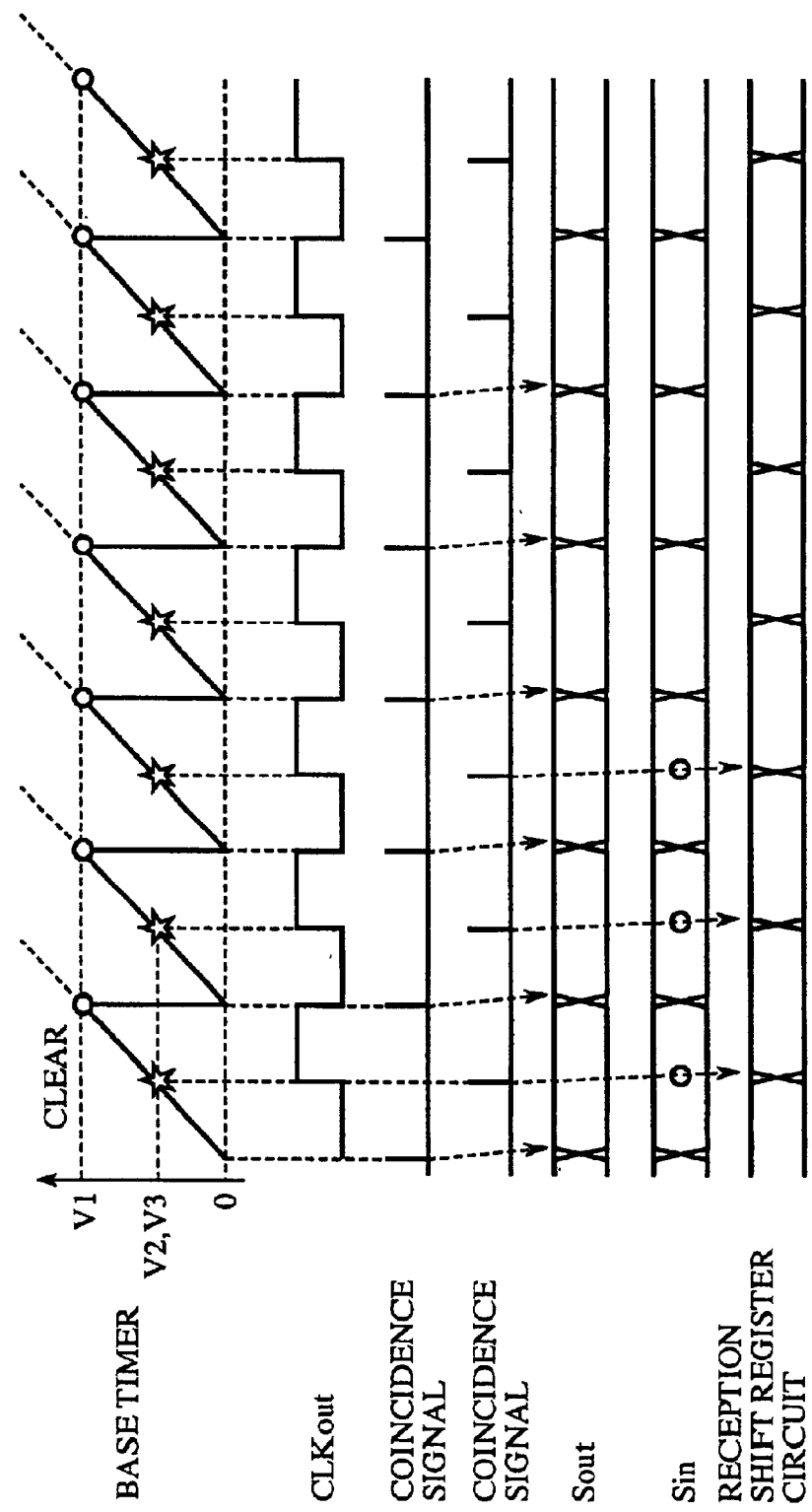
FIG. 9 is a timing chart of the data transmission and reception performed in the data input and output device shown in FIG. 8.

FIG. 9 is a timing chart of the data transmission and reception performed in the data input and output device according to the third embodiment.

The data transmission performed on the transmission side is initially described. The CPU (not shown) writes a setting value, which corresponds to a shift time of the transmission shift register circuit 4, in the comparison and coincidence register 2a. In detail, a value V1 of a count signal to be output from the base timer 1 at a first shift time is calculated in advance in the CPU, and the value V1 is initially stored in the comparison and coincidence register 2a as a setting value.

Thereafter, a count operation of the base timer 1 is started by using a control signal sent from the CPU as a trigger, and the value of the count signal is output to the comparison and coincidence register 2a for each prescribed time. In the comparison and coincidence register 2a, the value of the count signal is compared with the setting value. When the value of the count signal agrees with the setting value, the transmission coincidence signal set to "1" is output from the comparison and coincidence register 2a to the base timer 1a, the RS flip-flop 3 and the selector 6.

In the selector 6, the transmission coincidence signal is selected from a clock signal CLKin sent from the outside and the transmission coincidence signal, and the transmission coincidence signal is sent to the transmission shift register circuit 4. When the transmission coincidence signal is received in the transmission shift register circuit 4, a shift operation is performed in the transmission shift register circuit 4, and transmission data Sout is output from the transmission shift register circuit 4.

Also, when the transmission coincidence signal set to "1" is received in the base timer 1a, the value of the count signal is cleared to zero in the base timer 1a. Thereafter, the counting operation of the base timer 1a is restarted without changing the setting value stored in the comparison and coincidence register 2a, and the comparison and coincidence between the setting value and the value of the count signal is repeated. That is, each time the value of the count signal reaches the setting value, the value of the count signal is cleared to fix each time period from a restart time of the increment of the value of the count signal to a shift time of the shift operation of the transmission shift register circuit 4. Therefore, it is not required for the CPU to write another setting value corresponding to a next shift time in the comparison and coincidence register 2a. That is, the data transmission can be performed without changing the setting value initially stored in the comparison and coincidence register 2a.

Therefore, in cases where the comparison and coincidence between the setting value and the value of the count signal and the clearing of the count signal in response to the reception of the transmission coincidence signal set to "1" are repeated, the shift operations can be performed in the transmission shift register circuit 4 at a constant repetition period without changing the setting value, and the transmission data Sout can be output from the data input and output device at the constant repetition period.

In cases where the transmission data Sout is received on a reception side, a synchronization clock signal is required on the reception side. In this embodiment, the clock signal CLKout produced in the RS flip-flop 3 of the transmission side is used as the synchronization clock signal on the reception side. In this case, because the CPU of the reception side receives the clock signal CLKout in which the shift times of the shift operations of the transmission shift register circuit 4 of the transmission side are recorded, the shift time of each shift operation of the reception shift register circuit 5 of the reception side is, for example, set by the CPU to a middle time between each pair of adjacent shift times of the shift operations of the transmission shift register circuit 4 of the transmission side, and the setting value corresponding to the shift time of each shift operation of the reception shift register circuit 5 of the reception side is stored in the comparison and coincident register 2b under control of the CPU.

Accordingly, in cases where the setting value corresponding to a desired shift time of the transmission shift register circuit 4 is initially set in the comparison and coincidence register 2a, the shift operations can be always performed at the desired shift time in the transmission shift register circuit 4 to output the transmission data Sout from the data input and output device.

Next, the data reception performed on the reception side is described. Because the clock signal CLKout produced in the RS flip-flop 3 of the reception side is used as a synchronization clock signal of the data reception performed on the reception side, the reception data Sin is sent from the transmission shift register circuit 4 of the transmission side to the reception shift register circuit 5 of the reception side in synchronization with the clock signal CLKout produced on the reception side. Also, the CPU (not shown) of the reception side writes a setting value corresponding to each shift time of the reception shift register circuit 5 in the comparison and coincidence register 2b according to the clock signal CLKout. In detail, a value V2 of a count signal, which is to be output from the base timer 1 at a shift time of the shift operation of the reception shift register circuit 5, is calculated in advance in the CPU, and the value V2 is stored in the comparison and coincidence register 2b as a setting value. The value V2 is indicated by a star symbol which is placed on the count signal of the base timer shown in FIG. 9.

Thereafter, a count operation of the base timer 1 is started by using a control signal sent from the CPU as a trigger, and the value of the count signal is output to the comparison and coincidence register 2b for each prescribed time. In the comparison and coincidence register 2b, the value of the count signal is compared with the setting value. When the value of the count signal agrees with the setting value, the reception coincidence signal set to "1" is output from the comparison and coincidence register 2b to the RS flip-flop 3 and the selector 7. Also, the reception coincidence signal is sent to the CPU (not shown) as an interruption request signal.

In the selector 7, a clock signal CLKin sent from the outside and the reception coincidence signal are received, and the reception coincidence signal is selected and sent to the reception shift register circuit 5. When the reception coincidence signal is received in the reception shift register circuit 5, a shift operation is performed in the reception shift register circuit 5, and reception data Sin is received and sampled. Thereafter, the CPU, which receives the interruption request signal, writes a value V3 of the count signal, which is to be output from the base timer 1a at a next shift time of the reception shift register circuit 5, in the comparison and coincidence register 2b. The value V3 is indicated by a next star symbol which is placed on the count signal of the base timer shown in FIG. 9. A time interval between each pair of shift times adjacent to each other is set to a constant value.

Therefore, in cases where the writing of the setting value and the comparison and coincidence between the setting value and the value of the count signal are repeated, the shift operations can be performed in the reception shift register circuit 5 at a constant repetition period, and the reception data Sin can be received and sampled at the constant repetition period.

In cases where the reception data Sin is transmitted from a transmission side, a synchronization clock signal is required on the transmission side. In this embodiment, the clock signal CLKout produced in the RS flip-flop 3 of the reception side is used as the synchronization clock signal on the transmission side. In this case, because the CPU of the transmission side receives the clock signal CLKout in which the shift times of the shift operations of the reception shift register circuit 5 of the reception side are recorded, the shift time of each shift operation of the transmission shift register circuit 4 of the transmission side is, for example, set by the CPU to a middle time between each pair of adjacent shift times of the shift operations of the reception shift register circuit 5 of the reception side, and the setting value corresponding to the shift time of each shift operation of the transmission shift register circuit 4 of the transmission side is stored in the comparison and coincident register 2a under control of the CPU.

Accordingly, in cases where the setting value corresponding to each shift time of the transmission shift register circuit 4 is freely set and is stored in the comparison and coincidence register 2b according to a data transmission and reception program executed in the CPU, the shift operations can be performed at a desired repetition period in the reception shift register circuit 5, and the reception data Sin can be received and sampled at the desired repetition period. Therefore, even though the reception data Sin is transmitted from the transmission side to the reception side without synchronizing with the clock signal CLKout, the reception data Sin can be correctly received by appropriately changing the setting values which correspond to the shift times and are written in the comparison and coincident register 2b.

Also, the clock signal CLKout produced in the RS flip-flop 3 of the transmission side (or the reception side) is used as a synchronization clock signal on the transmission and reception sides to transmit and receive the data. However, it is applicable that the clock signal CLKin sent from the outside be selected in the selectors 6 and 7 as a synchronization clock signal to transmit the data from the transmission shift register circuit 4 and to receive data in the reception shift register circuit 5. In this case, the data transmission and reception is performed in the transmission shift register circuit 4 and the reception shift register circuit 5 in the same manner as in the conventional serial data input and output device by using the clock signal CLKin sent from the outside as a data shift clock signal.

As is described above, in the third embodiment, the value of the count signal is cleared to zero by the base timer 1a each time the transmission coincidence signal set to "1" is sent from the transmission comparison and coincident register 2a to the base timer 1a. Accordingly, the number of interruption operations performed by the CPU can be reduced. Also, the data transmission and reception timing in the transmission shift register circuit 4 and the reception shift register circuit 5 can be freely changed by setting a desired setting value in the transmission comparison and coincidence register 2a and the reception comparison and coincidence register 2b. Also, the timer function of the base timer 1a can be used to transmit and receive data, and the number of elements required in the data input and output device can be reduced in hardware.

In the third embodiment, the value of the count signal is cleared to zero in synchronization with the outputting of the transmission coincidence signal of the comparison and coincidence register 2a. However, it is applicable that the value of the count signal be cleared to zero in synchronization with the outputting of the reception coincidence signal of the comparison and coincidence register 2b.

Also, in the third embodiment, the setting value stored in the comparison and coincidence register 2b is rewritten each time a shift operation is performed in the reception shift register 5. However, it is applicable that the shift operations of the reception shift register circuit 5 be performed at shift times corresponding to the same setting value stored in the comparison and coincidence register 2b in the same manner as the shift operations of the transmission shift register circuit 4. In this case, the shift operations can be performed in the reception shift register 5 according to the setting value initially stored in the comparison and coincidence register 2b without changing the setting value.

Embodiment 4

Figure 10:
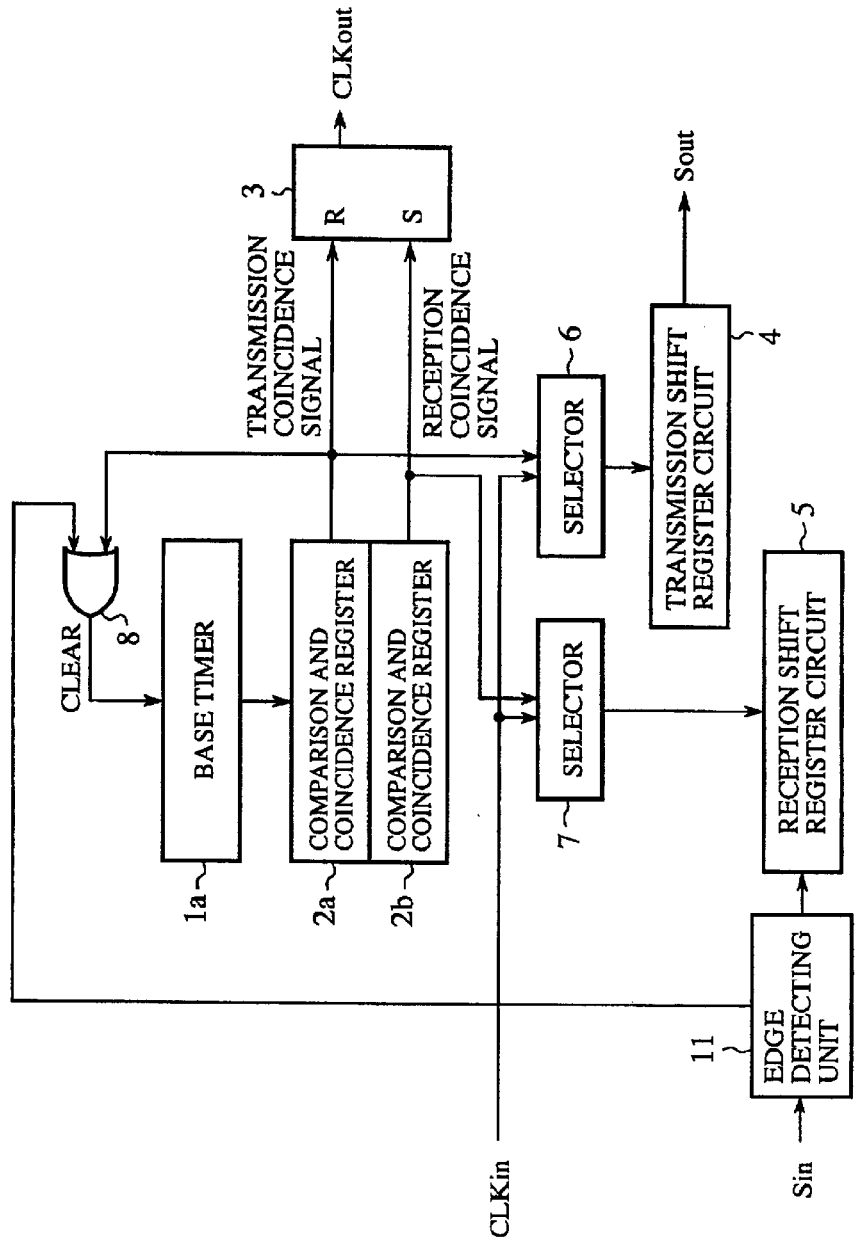
FIG. 10 is a block diagram showing the configuration of a data input and output device according to a fourth embodiment of the present invention.

FIG. 10 is a block diagram showing the configuration of a data input and output device according to a fourth embodiment of the present invention. In FIG. 10, 11 indicates an edge detecting unit. In cases where a failure occurs in the data reception of the reception data Sin so as to stop the data reception in the reception shift register circuit 5, a trailing edge of the reception data Sin is detected in the edge detecting unit 11, and a trailing edge signal set to a logical value "1" (high level) is output from the edge detecting unit 11. 8 indicates an OR gate. In the OR gate 8, a logical sum of the transmission coincidence signal of the comparison and coincidence register 2a and a value of the trailing edge signal output from the edge detecting unit 11 is calculated, and the logical sum is sent to the base timer 1a. The constituent elements, which are the same as those shown in FIG. 1, are indicated by the same reference numerals as those of the constituent elements shown in FIG. 1, and additional description of these constituent elements is omitted.

Next, an operation of the data input and output device will be described below.

In the fourth embodiment, the data transmission and reception is performed in synchronization with the clock signal CLKout produced in the data input and output device. That is, the transmission coincidence signal produced in the comparison and coincidence register 2a is selected in the selectors 6 and is sent to the transmission shift register circuit 4, and the reception coincidence signal produced in the comparison and coincidence register 2b is selected in the selectors 7 and is sent to the reception shift register circuit 5. Also, because a synchronization clock signal is required on a reception side (or a transmission side) to perform the data transmission and reception between the transmission and reception sides, the clock signal CLKout produced in the RS flip-flop 3 of the transmission side (or the reception side) is used on the reception side (or the transmission side).

Figure 11:
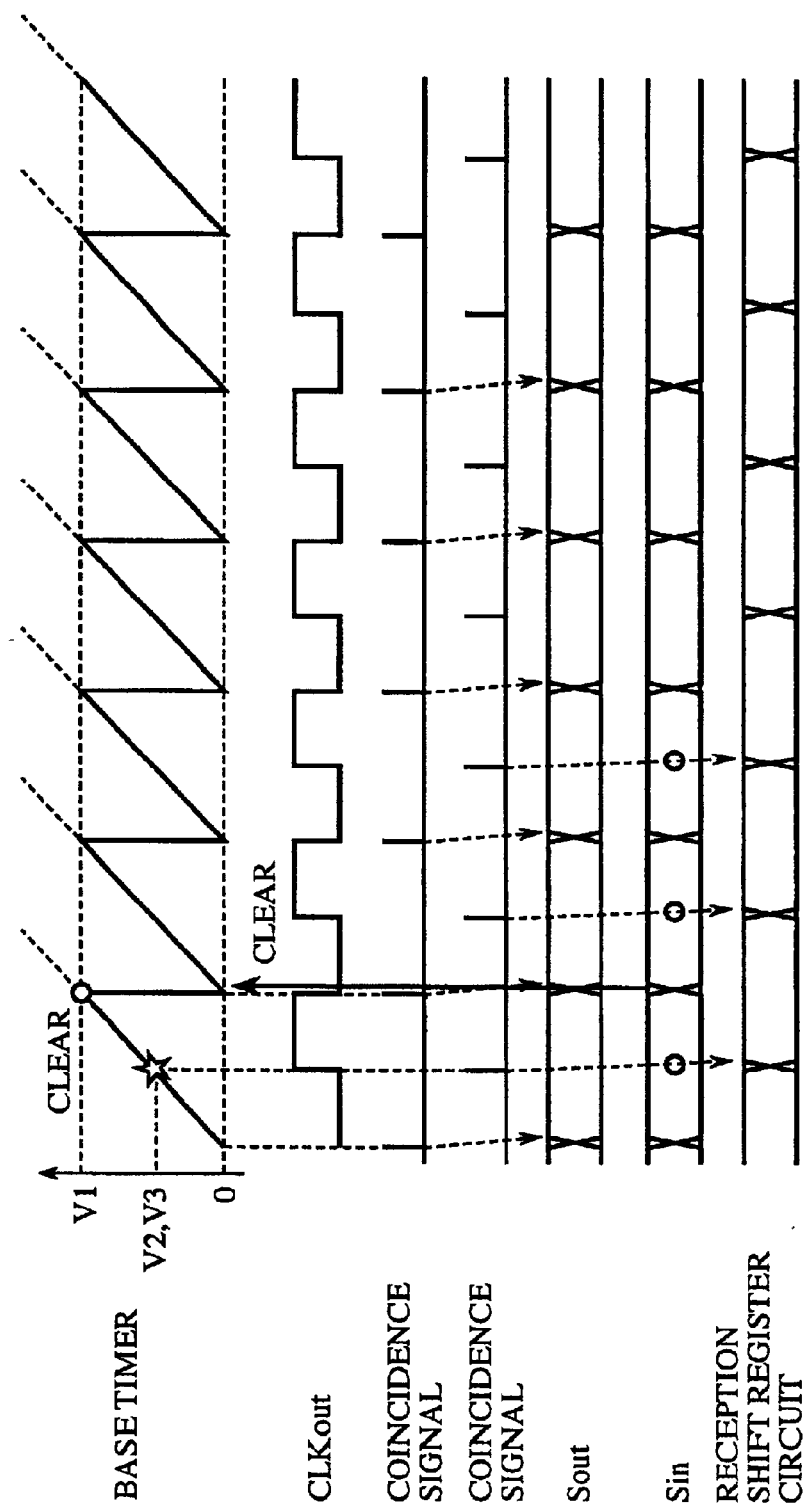
FIG. 11 is a timing chart of the data transmission and reception performed in the data input and output device shown in FIG. 10.

FIG. 11 is a timing chart of the data transmission and reception performed in the data input and output device according to the fourth embodiment.

The data transmission performed on the transmission side is initially described. The CPU (not shown) writes a setting value corresponding to a shift time of the transmission shift register circuit 4 in the comparison and coincidence register 2a. In detail, a value V1 of a count signal to be output from the base timer 1a at a shift time is calculated in advance in the CPU, and the value V1 is stored in the comparison and coincidence register 2a as a setting value. The value V1 is indicated by a circle symbol which is placed on the count signal of the base timer shown in FIG. 11.

Thereafter, a count operation of the base timer 1a is started by using a control signal sent from the CPU as a trigger, and the value of the count signal is output to the comparison and coincidence register 2a for each prescribed time. In the comparison and coincidence register 2a, the value of the count signal is compared with the setting value. When the value of the count signal agrees with the setting value, the transmission coincidence signal set to "1" is output from the comparison and coincidence register 2a to the RS flip-flop 3, the selector 6 and the OR gate 8.

In the selector 6, the transmission coincidence signal is selected from a clock signal CLKin sent from the outside and the transmission coincidence signal, and the transmission coincidence signal is sent to the transmission shift register circuit 4. When the transmission coincidence signal is received in the transmission shift register circuit 4, a shift operation is performed in the transmission shift register circuit 4, and transmission data Sout is output from the transmission shift register circuit 4.

Also, when the transmission coincidence signal set to "1" is received in the OR gate 8, an output signal set to a logical value "1" (high level) is sent from the OR gate 8 to the base timer 1a regardless of whether a value of the trailing edge signal output from the edge detecting unit 11 is set to "1". When the output signal set to the logical value "1" is received in the base timer 1a, the value of the count signal is cleared to zero in the base timer 1a. Thereafter, the counting operation of the base timer 1a is restarted without changing the setting value stored in the comparison and coincidence register 2a, and the comparison and coincidence between the setting value and the value of the count signal is repeated. That is, each time period from a restart time of the increment of the value of the count signal to a shift time of the shift operation of the transmission shift register circuit 4 is fixed in the same manner as in the third embodiment. Therefore, it is not required for the CPU to write another setting value corresponding to a next shift time in the comparison and coincidence register 2a. That is, the data transmission can be performed without changing the setting value initially stored in the comparison and coincidence register 2a.

Accordingly, in cases where the comparison and coincidence between the setting value and the value of the count signal and the clearing of the count signal in response to the reception of the transmission coincidence signal set to "1" are repeated, the shift operations can be performed in the transmission shift register circuit 4 at a constant repetition period without changing the setting value, and the transmission data Sout can be output from the data input and output device at the constant repetition period.

Also, in cases where the setting value corresponding to a desired shift time of the transmission shift register circuit 4 is initially set in the comparison and coincidence register 2a, the shift operations can be always performed at the desired shift time in the transmission shift register circuit 4 to output the transmission data Sout from the data input and output device.

Next, the data reception performed on the reception side is described. Because the clock signal CLKout produced in the RS flip-flop 3 of the reception side is used as a synchronization clock signal of the data reception performed on the reception side, the reception data Sin is sent from the transmission shift register circuit 4 of the transmission side to the reception shift register circuit 5 of the reception side in synchronization with the clock signal CLKout produced on the reception side. Also, the CPU (not shown) of the reception side writes a setting value corresponding to a shift time of the reception shift register circuit 5 in the comparison and coincidence register 2b according to the clock signal CLKout. In detail, a value V2 of a count signal, which is to be output from the base timer 1a at a shift time of the shift operation of the reception shift register circuit 5, is calculated in advance in the CPU, and the value V2 is stored in the comparison and coincidence register 2b as a setting value. The value V2 is indicated by a star symbol which is placed on the count signal of the base timer shown in FIG. 11.

Thereafter, a count operation of the base timer 1a is started by using a control signal sent from the CPU as a trigger, and the value of the count signal is output to the comparison and coincidence register 2b for each prescribed time. In the comparison and coincidence register 2b, the value of the count signal is compared with the setting value. When the value of the count signal agrees with the setting value, the reception coincidence signal set to "1" is output from the comparison and coincidence register 2b to the RS flip-flop 3 and the selector 7. Also, the reception coincidence signal is sent to the CPU (not shown) as an interruption request signal.

In the selector 7, the reception coincidence signal is selected from both a clock signal CLKin sent from the outside and the reception coincidence signal, and the reception coincidence signal is sent to the reception shift register circuit 5. When the reception coincidence signal is received in the reception shift register circuit 5, a shift operation is performed in the reception shift register circuit 5, and reception data Sin is received and sampled through the edge detecting unit 11.

In this case, when a failure occurs in the reception of the reception data Sin so as to temporarily stop the data reception in the reception shift register circuit 5, the value of the count signal counted in the base timer 1a is cleared, the counting operation of the base timer 1a is restarted, and the comparison and coincidence between the setting value of the comparison and coincident register 2b and the value of the count signal is again performed. Therefore, even though a failure occurs in the reception of the reception data Sin, the reception of the reception data Sin can be performed in the reception shift register circuit 5 while synchronizing the reception timing of the reception data Sin with the transmission timing of the reception data Sin on the transmission side.

In detail, when a failure occurs in the reception of the reception data Sin, a trailing edge of the reception data Sin is detected in the edge detecting unit 11, a trailing edge signal set to a logical value "1" (high level) is output from the edge detecting unit 11 to the OR gate 8, and an output signal set to a logical value "1" (high level) is sent from the OR gate 8 to the base timer 1a regardless of whether the transmission coincidence signal sent from the comparison and coincidence register 2a is set to "1". Therefore, each time a trailing edge of the reception data Sin is detected in the edge detecting unit 11, the value of the count signal is cleared to zero in the base timer 1a, and the counting operation of the base timer 1a is restarted to again perform the comparison and coincidence between the setting value of the comparison and coincident register 2b and the value of the count signal.

Thereafter, the CPU, which receives the interruption request signal, writes a value V3 of the count signal, which is to be output from the base timer 1a at a next shift time of the reception shift register circuit 5, in the comparison and coincidence register 2b. The value V3 is indicated by a next star symbol which is placed on the count signal of the base timer shown in FIG. 11. A time interval between each pair of shift times adjacent to each other is set to a constant value.

Therefore, in cases where the writing of the setting value and the comparison and coincidence between the setting value and the value of the count signal are repeated, the shift operations can be performed in the reception shift register circuit 5 at a constant repetition period, and the reception data Sin can be received and sampled at the constant repetition period.

Also, in cases where the setting value corresponding to each shift time of the transmission shift register circuit 4 is freely set and is stored in the comparison and coincidence register 2b according to a data transmission and reception program executed in the CPU, the shift operations can be performed at a desired repetition period in the reception shift register circuit 5, and the reception data Sin can be received and sampled at the desired repetition period. Therefore, even though the reception data Sin is transmitted from the transmission side to the reception side without synchronizing with the clock signal CLKout, the reception data Sin can be correctly received by appropriately changing the setting values which correspond to the shift times and are written in the comparison and coincident register 2b.

Also, the clock signal CLKout produced in the RS flip-flop 3 of the transmission side (or the reception side) is used as a synchronization clock signal on the transmission and reception sides to transmit and receive the data. However, it is applicable that the clock signal CLKin sent from the outside be selected in the selectors 6 and 7 as a synchronization clock signal to transmit the data from the transmission shift register circuit 4 and to receive data in the reception shift register circuit 5. In this case, the data transmission and reception is performed in the transmission shift register circuit 4 and the reception shift register circuit 5 in the same manner as in the conventional serial data input and output device by using the clock signal CLKin sent from the outside as a data shift clock signal.

As is described above, in the fourth embodiment, a trailing edge of the reception data Sin is detected in the edge detecting unit 11, a trailing edge signal is output from the edge detecting unit 11 to the OR gate 8, an output signal is sent from the OR gate 8 to the base timer 1a, and the value of the count signal is cleared. Accordingly, even though a failure occurs in the reception of the reception data Sin, the reception of the reception data Sin can be performed in the reception shift register circuit 5 in synchronization with the reception data Sin.

In the fourth embodiment, a trailing edge of the reception data Sin is detected in the edge detecting unit 11 each time a failure occurs in the reception of the reception data Sin. However, because not only the trailing edge but also a leading edge is generated in a signal of the reception data Sin each time a failure occurs in the reception of the reception data Sin, it is applicable that a leading edge of the reception data Sin be detected in the edge detecting unit 11.

Also, in the fourth embodiment, the OR gate 8 and the edge detecting unit 11 are additionally arranged in the data input and output device of the first embodiment. However, it is applicable that the OR gate 8 and the edge detecting unit 11 be additionally arranged in the data input and output device of the second embodiment.

Also, in the fourth embodiment, the setting value stored in the comparison and coincidence register 2b is rewritten each time a shift operation is performed in the reception shift register 5. However, it is applicable that the shift operations of the reception shift register circuit 5 be performed at shift times corresponding to the same setting value stored in the comparison and coincidence register 2b in the same manner as the shift operations of the transmission shift register circuit 4. In this case, the shift operations can be performed in the reception shift register 5 according to the setting value initially stored in the comparison and coincidence register 2b without changing the setting value.

Also, in the third and fourth embodiments, it is not required to rewrite the setting value stored in each of the comparison and coincidence registers 2a and 2b. However, in a certain situation, it is required to rewrite the setting value stored in each of the comparison and coincidence registers 2a and 2b according to a serial communication protocol used by the transmission and reception sides. In this case, it is preferred that the rewriting of the setting value is performed according to either the interruption operation of the CPU or a direct memory access transfer function not using the CPU.

Embodiment 5

Another idea for rewiring the setting value stored in each of the comparison and coincidence registers 2a and 2b is described.

Figure 12:
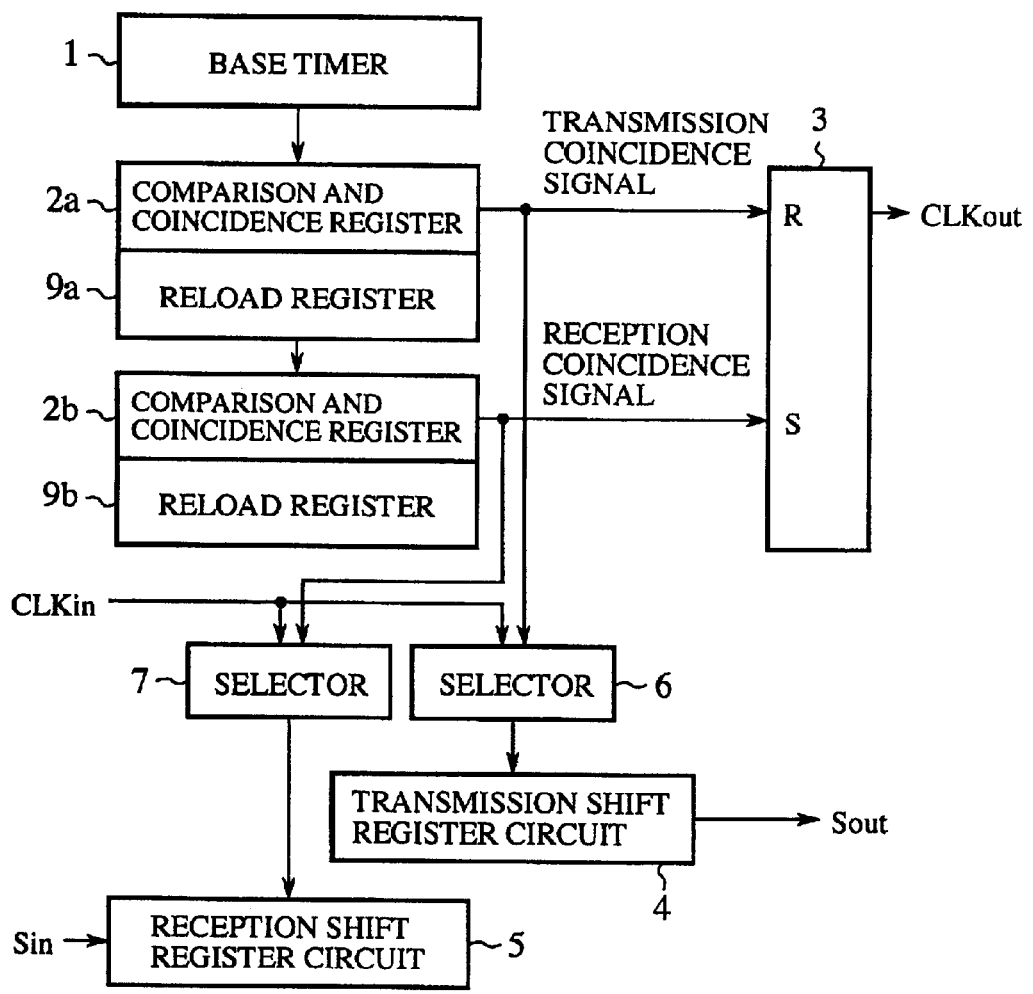
FIG. 12 is a block diagram showing the configuration of a data input and output device according to a fifth embodiment of the present invention.

FIG. 12 is a block diagram showing the configuration of a data input and output device according to a fifth embodiment of the present invention. In FIG. 12, 9a indicates a reload register (or a reload register circuit) arranged with the comparison and coincidence register 2a, and 9b indicates a reload register (or a reload register circuit) arranged with the comparison and coincidence register 2b. All setting values to be written in the comparison and coincidence register 2a are stored in the reload register 9a, and a prescribed setting value stored in the reload register 9a is written in the comparison and coincidence register 2a each time the transmission coincidence signal set to the logical value "1" is output from the comparison and coincidence register 2a. Also, all setting values to be written in the comparison and coincidence register 2b are stored in the reload register 9b, and a prescribed setting value stored in the reload register 9b is written in the comparison and coincidence register 2b each time the reception coincidence signal set to the logical value "1" is output from the comparison and coincidence register 2b. The constituent elements, which are the same as those shown in FIG. 1, are indicated by the same reference numerals as those of the constituent elements shown in FIG. 1, and additional description of these constituent elements is omitted.

Next, an operation of the data input and output device will be described below.

In the data transmission, a value stored in the reload register 9a of the transmission side is initially written in the comparison and coincidence register 2a as a setting value, and the counting operation is performed in the base timer 1. When the value of the count signal agrees with the setting value of the comparison and coincidence register 2a, the transmission coincidence signal set to the logical value "1" is output to the RS flip-flop 3 and the selector 6, and the shift operation of the transmission shift register circuit 4 is performed in the same manner as in the first embodiment to output the transmission data Sout. Also, a next setting value is written in the comparison and coincidence register 2a by the reload register 9a in synchronization with the outputting of the transmission coincidence signal set to the logical value "1".

In the data reception, a value stored in the reload register 9b of the reception side is initially written in the comparison and coincidence register 2b as a setting value, and the counting operation is performed in the base timer 1. When the value of the count signal agrees with the setting value of the comparison and coincidence register 2b, the reception coincidence signal set to the logical value "1" is output to the RS flip-flop 3 and the selector 7, and the shift operation of the reception shift register circuit 5 is performed in the same manner as in the first embodiment to receive and sample the reception data Sin. Also, a next setting value is written in the comparison and coincidence register 2b by the reload register 9b in synchronization with the outputting of the reception coincidence signal set to the logical value "1".

Accordingly, the setting values of the comparison and coincidence registers 2a and 2b can be rewritten without performing the interruption operation of the CPU or using the direct memory accessing transfer function.

Also, in cases where a data transfer rate of the transmission data Sout is too high to perform the interruption operation of the CPU or to use the direct memory accessing transfer function, the writing of the setting values using the reload registers 9a and 9b is useful.

In the fifth embodiment, the reload registers 9a and 9b are additionally arranged in the data input and output device of the first embodiment. However, it is applicable that the reload registers 9a and 9b be additionally arranged in the data input and output device of the second, third or fourth embodiments.

Embodiment 6

Figure 13:
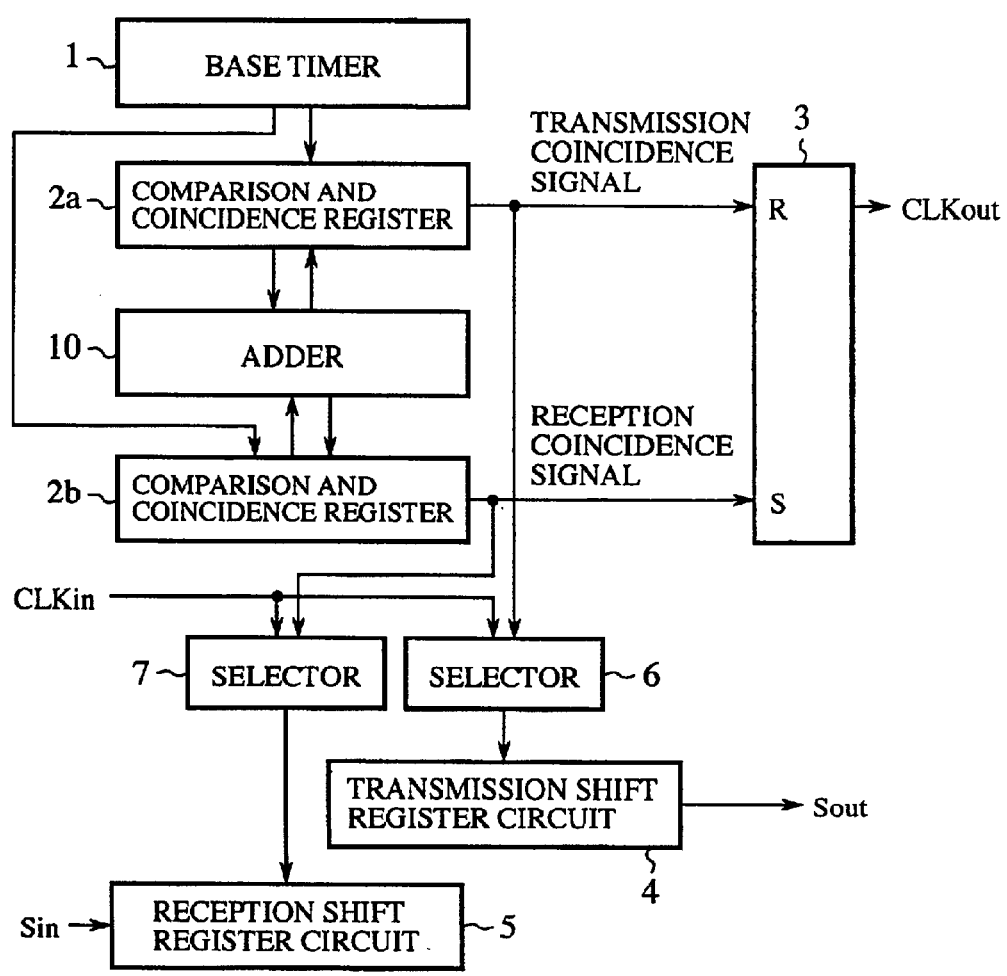
FIG. 13 is a block diagram showing the configuration of a data input and output device according to a sixth embodiment of the present invention.
Figure 14:
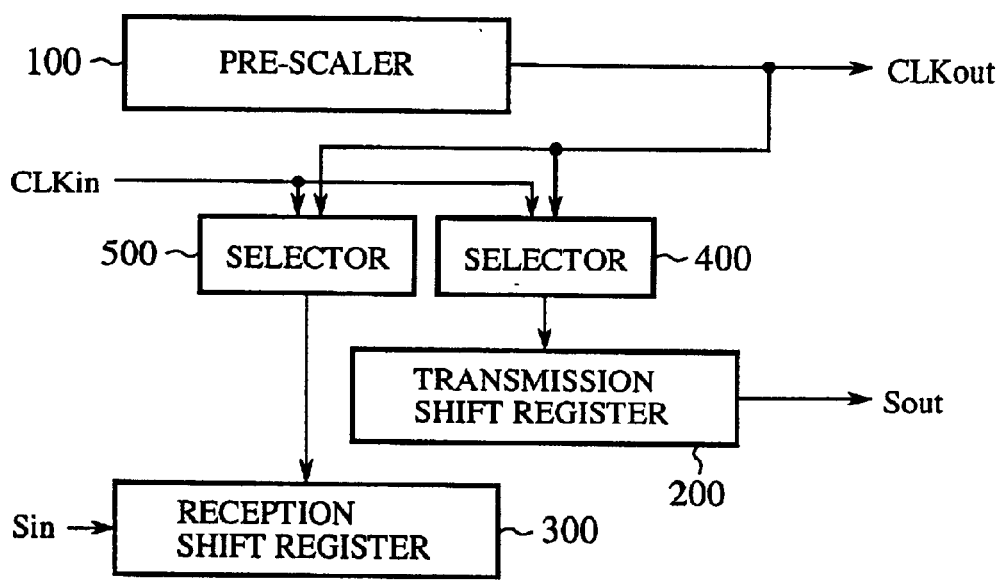
FIG. 14 is a block diagram showing the configuration of a conventional data input and output device.
Figure 15:
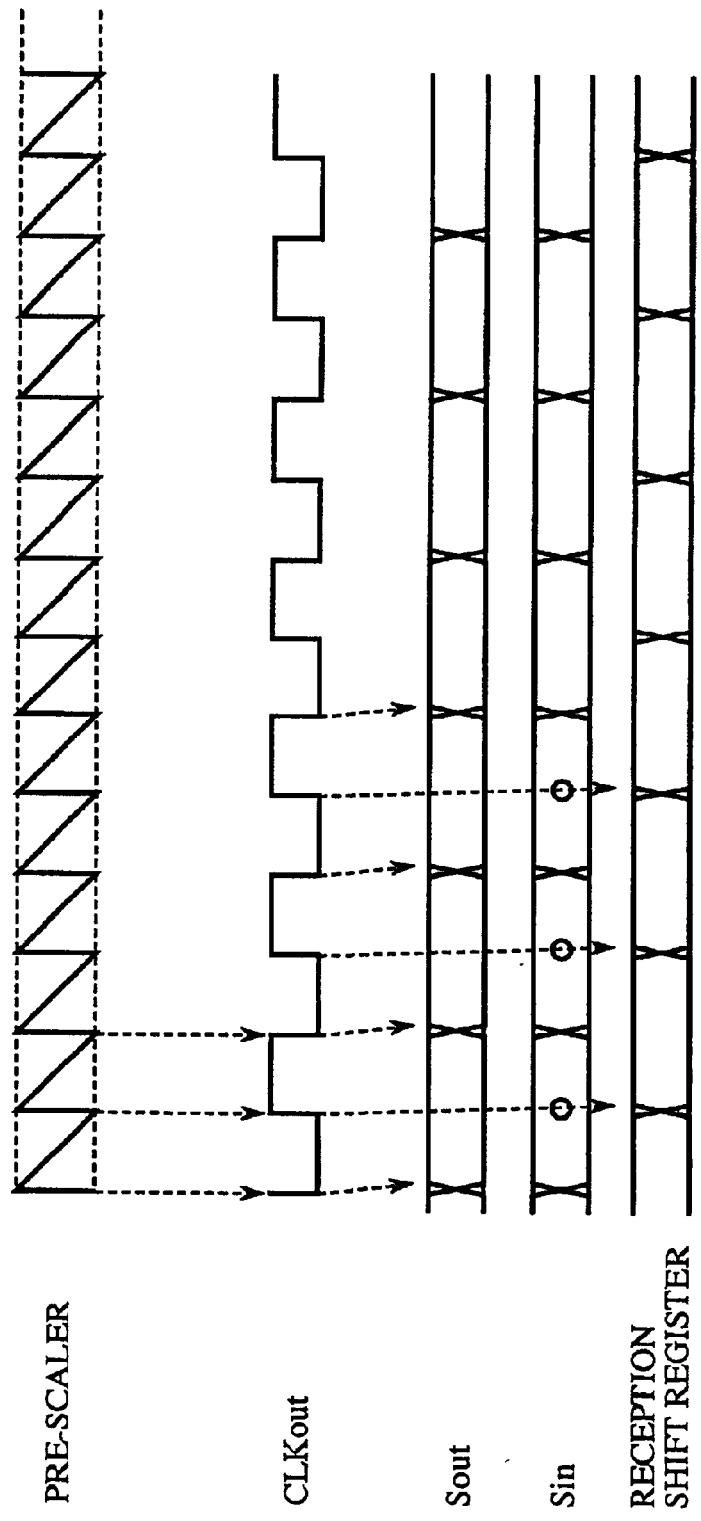
FIG. 15 is a timing chart of the data transmission and reception performed in the conventional data input and output device shown in FIG. 14.

FIG. 13 is a block diagram showing the configuration of a data input and output device according to a sixth embodiment of the present invention. In FIG. 13, 10 indicates an adder. In the adder 10, each time the transmission coincidence signal set to the logical value "1" is output from the comparison and coincidence register 2a, a first constant value corresponding to a transfer rate is added to a setting value stored in the comparison and coincidence register 2a to rewrite the setting value to a next setting value. Also, each time the reception coincidence signal set to the logical value "1" is output from the comparison and coincidence register 2b, a second constant value corresponding to a transfer rate is added to a setting value stored in the comparison and coincidence register 2b to rewrite the setting value to a next setting value. The constituent elements, which are the same as those shown in FIG. 1, are indicated by the same reference numerals as those of the constituent elements shown in FIG. 1, and additional description of these constituent elements is omitted.

Next, an operation of the data input and output device will be described below.

In the data transmission, a setting value is initially written in the comparison and coincidence register 2a by the CPU of the transmission side, and the counting operation is performed in the base timer 1. When the value of the count signal agrees with the setting value of the comparison and coincidence register 2a, the transmission coincidence signal set to the logical value "1" is output to the RS flip-flop 3, the selector 6 and the adder 10, and the shift operation of the transmission shift register circuit 4 is performed in the same manner as in the first embodiment to output the transmission data Sout. Also, when the adder 10 receives the transmission coincidence signal set to the logical value "1", a first constant value corresponding to a transfer rate is added to the setting value of the comparison and coincidence register 2a to rewrite the setting value to a next setting value.

In the data reception, a setting value is initially written in the comparison and coincidence register 2b by the CPU of the reception side, and the counting operation is performed in the base timer 1. When the value of the count signal agrees with the setting value of the comparison and coincidence register 2b, the reception coincidence signal set to the logical value "1" is output to the RS flip-flop 3, the selector 6 and the adder 10, and the shift operation of the reception shift register circuit 5 is performed in the same manner as in the first embodiment to receive and sample the reception data Sin. Also, when the adder 10 receives the reception coincidence signal set to the logical value "1", a second constant value corresponding to a transfer rate is added to the setting value of the comparison and coincidence register 2b to rewrite the setting value to a next setting value.

Accordingly, the setting values of the comparison and coincidence registers 2a and 2b can be automatically rewritten without performing the interruption operation of the CPU or using the direct memory accessing transfer function.

In the sixth embodiment, the adder 10 is additionally arranged in the data input and output device of the first embodiment. However, it is applicable that the adder 10 be additionally arranged in the data input and output device of the second, third or fourth embodiments.

What is claimed is:

1. A data input and output device comprising:
a timer circuit for counting a value of a count signal, resetting the value of the count signal to an initial value each time the value of the count signal reaches a prescribed value and outputting the value of the count signal at a prescribed interval;
a comparison and coincidence register circuit for storing a setting value, comparing the setting value with the value of the count signal output from the timer circuit and outputting a coincidence signal each time the setting value agrees with the value of the count signal;
a clock selecting circuit for receiving both an external clock signal and each coincidence signal output from the comparison and coincidence register circuit, selecting one of the signals and outputting the selected signal as a data shift clock signal; and
a data shift register circuit for performing a data transmission or reception each time the data shift clock signal is received from the clock selecting circuit.

2. A data input and output device according to claim 1, wherein the comparison and coincidence register circuit comprises
a transmission comparison and coincidence register circuit for storing a setting value corresponding to a data transmission time and outputting a transmission coincidence signal as the coincidence signal each time the setting value agrees with the value of the count signal output from the timer circuit; and
a reception comparison and coincidence register circuit for storing a setting value corresponding to a data reception time and outputting a reception coincidence signal as the coincidence signal each time the setting value agrees with the value of the count signal output from the timer circuit, and
the value of the count signal is cleared to the initial value in the timer circuit each time the transmission coincidence signal output from the transmission comparison and coincidence register circuit or the reception coincidence signal output from the reception comparison and coincidence register circuit is received in the timer circuit.

3. A data input and output device according to claim 1, further comprising:
a flip-flop circuit for setting a logical value of a synchronization clock signal of a data transmission and reception in synchronization with the reception of each coincidence signal from the comparison and coincidence register circuit and outputting the synchronization clock signal.

4. A data input and output device according to claim 1, wherein the value of the count signal is cleared to the initial value in response to each leading edge or each trailing edge of a data signal received by the data shift register circuit.

5. A data input and output device according to claim 1, wherein the setting value of the comparison and coincidence register circuit is stored according to a direct memory access.

6. A data input and output device according to claim 1, further comprising:
a reload register circuit for sending a new setting value to the comparison and coincidence register circuit each time the setting value stored in the comparison and coincidence register circuit agrees with the value of the count signal.

7. A data input and output device according to claim 1, further comprising:
an adder for adding a prescribed value to the setting value stored in the comparison and coincidence register circuit to store a new setting value in the comparison and coincidence register circuit each time the setting value stored in the comparison and coincidence register circuit agrees with the value of the count signal.

8. A data input and output device according to claim 1, wherein the value of the count signal counted by the timer circuit is incremented, and the value of the count signal is reset to zero.

9. A data input and output device comprising:
a timer circuit for counting a value of a count signal, resetting the value of the count signal to an initial value each time the value of the count signal reaches a prescribed value and outputting the value of the count signal at a prescribed interval;
a comparison and coincidence register circuit for storing a setting value corresponding to a data transmission time and a setting value corresponding to a data reception time, comparing the setting value corresponding to the data transmission time with the value of the count signal output from the timer circuit, comparing the setting value corresponding to the data reception time with the value of the count signal output from the timer circuit, outputting a transmission coincidence signal each time the setting value corresponding to the data transmission time agrees with the value of the count signal and outputting a reception coincidence signal each time the setting value corresponding to the data reception time agrees with the value of the count signal;

a flip-flop circuit for setting a logical value of a synchronization clock signal to a first value in synchronization with the reception of each transmission coincidence signal from the comparison and coincidence register circuit, setting a logical value of the synchronization clock signal to a second value different from the first value in synchronization with the reception of each reception coincidence signal from the comparison and coincidence register circuit and outputting the synchronization clock signal having two logical values;

a clock selecting circuit for receiving an external clock signal and the synchronization clock signal output from the flip-flop circuit, selecting one of the signals and outputting the selected signal as a data shift clock signal; and a data shift register circuit for performing a data transmission or reception in synchronization with each logical value of the data shift clock signal received from the clock selecting circuit.

10. A data input and output device according to claim 9, wherein the value of the count signal is cleared to the initial value in response to each leading edge or each trailing edge of a data signal received by the data shift register circuit.

11. A data input and output device according to claim 9, wherein the setting value of the comparison and coincidence register circuit is stored according to a direct memory access.

12. A data input and output device according to claim 9, further comprising:

a reload register circuit for sending a new setting value to the comparison and coincidence register circuit each time the setting value stored in the comparison and coincidence register circuit agrees with the value of the count signal.

13. A data input and output device according to claim 9, further comprising:

an adder for adding a prescribed value to the setting value stored in the comparison and coincidence register circuit to store a new setting value in the comparison and coincidence register circuit each time the setting value stored in the comparison and coincidence register circuit agrees with the value of the count signal.

14. A data input and output device according to claim 9, wherein the value of the count signal counted by the timer circuit is incremented, and the value of the count signal is reset to zero.

* * * * *